US012455018B2

(12) United States Patent
Andersen

(10) Patent No.: US 12,455,018 B2
(45) Date of Patent: Oct. 28, 2025

(54) VALVE ARRANGEMENT, ACTUATOR ARRANGEMENT AND METHODS OF DETECTING A FIRST POSITION THEREIN

(71) Applicant: ALFA LAVAL CORPORATE AB, Lund (SE)

(72) Inventor: Jens Folkmar Andersen, Fredericia (DK)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 18/568,674

(22) PCT Filed: Jun. 9, 2022

(86) PCT No.: PCT/EP2022/065753
§ 371 (c)(1),
(2) Date: Dec. 8, 2023

(87) PCT Pub. No.: WO2022/263295
PCT Pub. Date: Dec. 22, 2022

(65) Prior Publication Data
US 2024/0209957 A1     Jun. 27, 2024

(30) Foreign Application Priority Data
Jun. 15, 2021   (EP) .................................... 21179465

(51) Int. Cl.
*F16K 37/00*   (2006.01)
*F16K 11/044*   (2006.01)
*F16K 31/122*   (2006.01)

(52) U.S. Cl.
CPC ........ *F16K 37/0033* (2013.01); *F16K 11/044* (2013.01); *F16K 37/0008* (2013.01); *F16K 31/122* (2013.01)

(58) Field of Classification Search
CPC .. F16K 37/0033; F16K 37/0041; F16K 1/446; F16K 31/1225; F16K 11/044
See application file for complete search history.

(56) References Cited

U.S. PATENT DOCUMENTS

| 4,368,753 A | 1/1983 | Braekelmann et al. |
| 4,522,223 A | 6/1985 | Balsys et al. |

(Continued)

FOREIGN PATENT DOCUMENTS

| DE | 202006012959 U1 | 10/2006 |
| DE | 102006039493 A1 | 3/2008 |

(Continued)

OTHER PUBLICATIONS

International Search Report (PCT/ISA/210) and Written Opinion (PCT/ISA/237) mailed on Sep. 21, 2022, by the European Patent Office as the International Searching Authority for International Application No. PCT/EP2022/065753. (12 pages).

*Primary Examiner* — Atif H Chaudry
(74) *Attorney, Agent, or Firm* — BUCHANAN INGERSOLL & ROONEY PC

(57) ABSTRACT

A valve arrangement, an actuator arrangement and related methods, in which a first cleaning position is detected by mechanically transfer at least a portion of a movement of, or provided to, a first valve stem into a first movement of a second valve stem, such that a second valve member is moved towards a first conduit while the second valve member still sealingly engages a second valve seat, whereby a movement of a first valve member is detectable by a control unit by detection of the first movement of the second valve stem in a direction which extends towards the control unit.

19 Claims, 9 Drawing Sheets

(56) References Cited

U.S. PATENT DOCUMENTS

| | | |
|---|---|---|
| 8,925,576 B2 | 1/2015 | Spliethoff et al. |
| 9,423,035 B2 | 8/2016 | Burmester |
| 2009/0139587 A1 | 6/2009 | Tucholski et al. |
| 2009/0140191 A1 | 6/2009 | Spliethoff et al. |
| 2010/0072411 A1 | 3/2010 | Norton |
| 2018/0259950 A1* | 9/2018 | Priisholm ............... F16K 1/446 |

FOREIGN PATENT DOCUMENTS

| | | |
|---|---|---|
| DE | 102006058398 A1 | 6/2008 |
| WO | 2017042361 A1 | 3/2017 |

\* cited by examiner

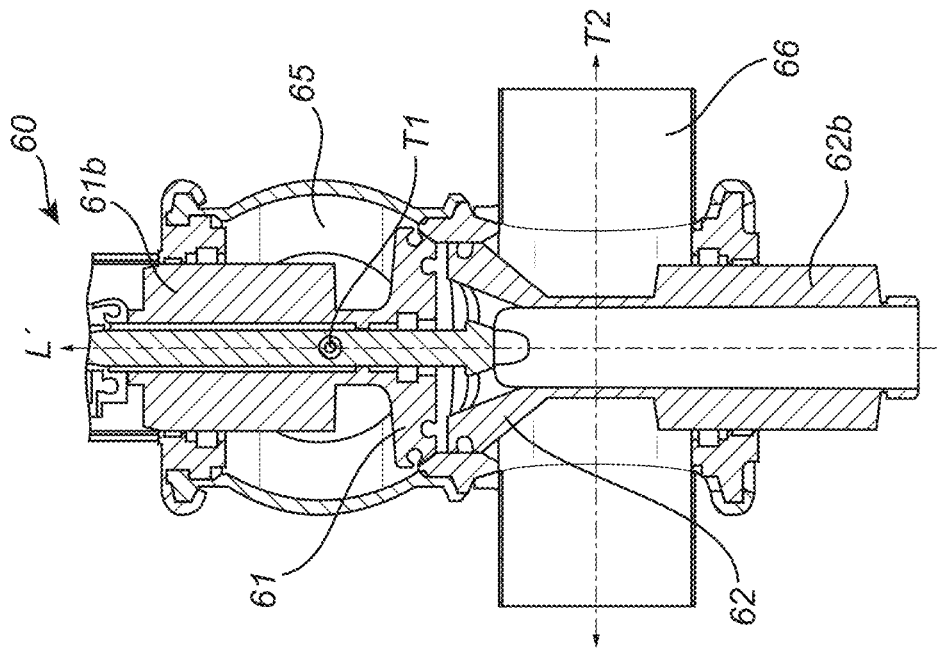
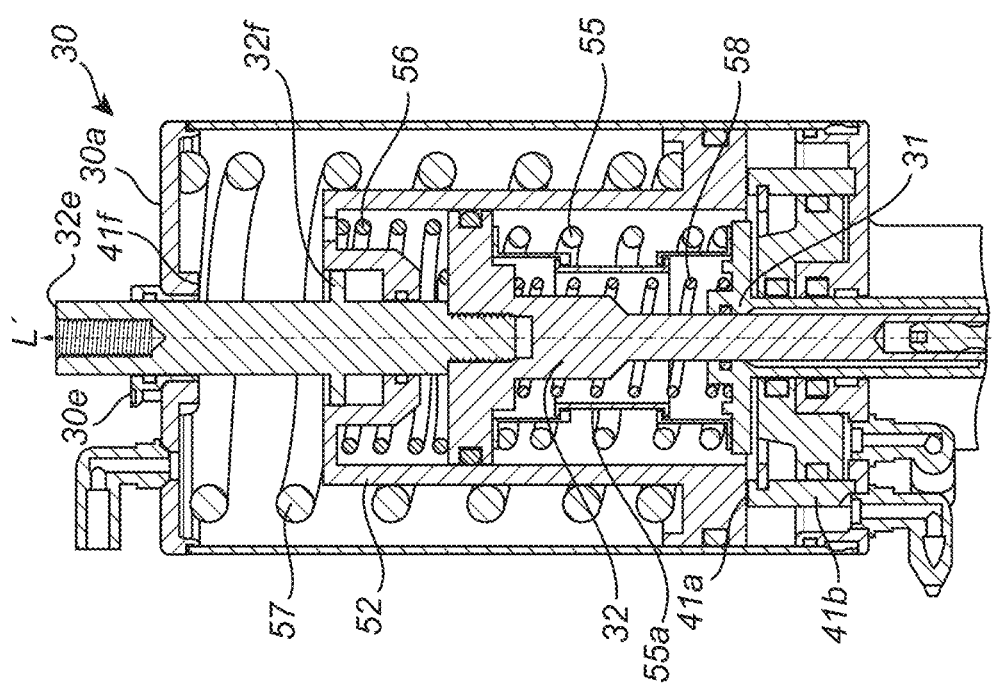
Fig. 3A
Fig. 3B

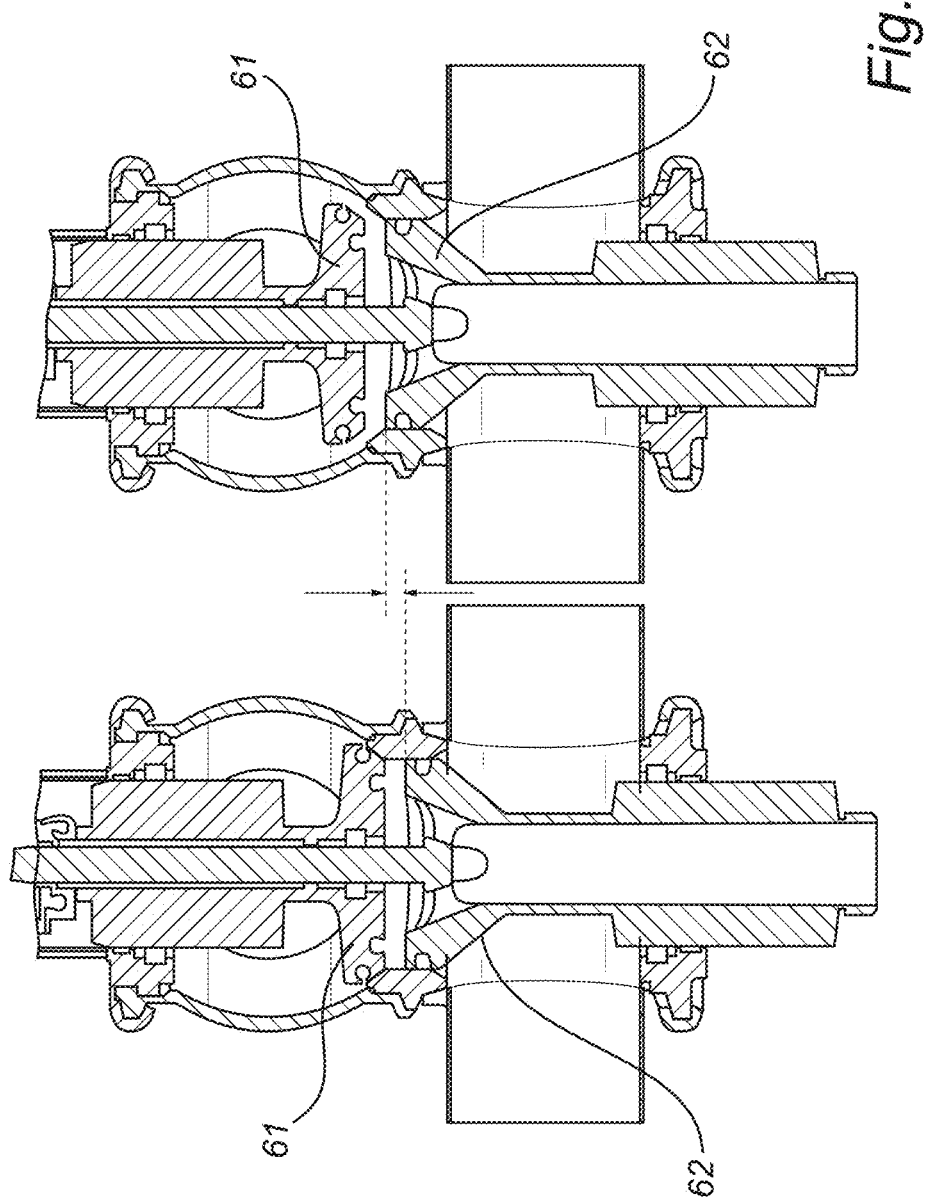

VALVE ARRANGEMENT, ACTUATOR ARRANGEMENT AND METHODS OF DETECTING A FIRST POSITION THEREIN

FIELD OF INVENTION

The disclosure relates to a valve arrangement comprising a control unit, an actuator arrangement, and a flow control arrangement.

The disclosure relates to an actuator arrangement.

The disclosure also relates to a method for detecting a first cleaning position of the valve arrangement comprising the actuator arrangement and the flow control arrangement.

The disclosure also relates to a method for detecting a first cleaning position of the actuator arrangement.

TECHNICAL BACKGROUND

There are many different types of valve arrangements that are deployed in various industrial applications. The valve arrangements may comprise a control unit, an actuator arrangement, and a flow control arrangement, wherein the actuator arrangement may be controlled by the control unit and may be configured to control the flow control arrangement. Such valve arrangements include seat valves of both single-seat type and double-set type, as well as membrane valves, butterfly valves etc. The valve arrangements may be designed as on-off valves, changeover valves, mixing valves, pressure regulating valves, control valves, sampling valves, etc. The fluid valves may also be equipped with seat-lift functions to facilitate cleaning, which gives rise to further alternative configurations of the fluid valves.

For some applications, it is desirous to being able to detect functionalities of the valve arrangement to verify that the respective functionality is performed in the intended manner, e.g. that the seat-lift functions occur such that the intended cleaning is performed. Further, it is typically desirous to provide for detecting functionalities of the fluid valve in an efficient, accurate and secure way In an attempt to address this, document WO 2017/042361 discloses a valve controller for controlling a valve. The valve controller comprising equipment for controlling the function of at least one of an actuator and a flow control unit of the valve. The valve is equipped with external sensors capable of detecting parameters related to different components comprised in the valve. The sensors may be connected to the control unit and based on the detected parameters; the control unit may be capable of detecting the respective functions/functionalities of the valve.

However, as will be explained below, there is still room for improvements when it comes to adequately addresses the set of design criteria of enabling detection and verification of certain functions/functionalities of the valve in an efficient, accurate and secure way.

SUMMARY OF INVENTION

It is an object of the invention to provide a solution which adequately addresses the set of design criteria of enabling detection and verification of all functions/functionalities of the valve in an efficient, accurate and secure way.

This object has been achieved by a valve arrangement comprising
 a control unit,
 an actuator arrangement, and
 a flow control arrangement,
 the actuator arrangement being controlled by the control unit and being configured to control the flow control arrangement,
 the actuator arrangement comprising:
 a first valve stem extending along a longitudinal direction towards the flow control arrangement and being configured to be connected to and control movement of a first valve member of the flow control arrangement,
 a second valve stem extending along the longitudinal direction and being configured to be connected to and control movement of a second valve member of the flow control arrangement, wherein the first valve stem is hollow and the second valve stem extends inside the first valve stem, and wherein the second valve stem extends through the actuator arrangement and into the control unit such that the control unit is capable of detecting the position of the second valve stem along the longitudinal direction,
 wherein the flow control arrangement comprises a first and a second conduit section each being configured to allow a respective flow of a fluid and being arranged beside each other as seen along the longitudinal direction, wherein the two conduit sections are fluidly interconnected by a mixing opening being selectively closable and openable by a double valve formed by the first and second valve members, wherein in a closed state of the double valve, the first and second valve members are sealingly engaging a first and a second valve seat, respectively, each valve seat extending around the mixing opening, wherein the first and second valve members are movable relative to each other to allow selective cleaning of the first respectively the second conduit section, of the first respectively the second valve member, and of the first respectively the second valve seat,
 wherein in a first cleaning position, or more precisely when setting in a first cleaning position, or even more precisely when moving from the closed state to a first cleaning position, in which the first conduit, the first valve member and first valve seat are to be cleaned, the first valve stem is configured to provide a movement of the first valve member into the first conduit thereby exposing the first valve seat,
 wherein in the first cleaning position, or more precisely when setting in the first cleaning position, or even more precisely when moving from the closed state to the first cleaning position, the actuator arrangement is configured to mechanically transfer at least a portion of the movement of, or provided to, the first valve stem into a first movement of the second valve stem, such that the second valve member is moved towards the first conduit while the second valve member still sealingly engages the second valve seat, whereby the movement of the first valve member is detectable by the control unit by detection of the first movement of the second valve stem in a direction which extends opposite to the longitudinal direction and thereby extends towards the control unit.

The first cleaning position may be a first cleaning position of the valve arrangement, and/or a first cleaning position of the actuator arrangement and/or of the flow control arrangement, such as of the double valve. The closed state may be a closed state of the valve arrangement, and/or a closed state of the actuator arrangement and/or of the flow control arrangement, such as of the double valve.

The valve arrangement may be set in the first cleaning position, and/or the actuator arrangement and/or the flow control arrangement, such as the double valve, may be set in the first cleaning position. The valve arrangement may be moved from the closed state to the first cleaning position, and/or the actuator arrangement and/or the flow control arrangement, such as the double valve, may be moved from the closed state to the first cleaning position.

The first valve seat is exposed in the first cleaning position. The second valve member sealingly engages the second valve seat in the first cleaning position.

The first valve stem may sometimes be referred to as an outer valve stem. The first valve stem may be a single piece of material, but it is preferred that it is formed of at least one part forming part of the actuator arrangement and one part forming part of the flow control arrangement, the two or more parts being coupled to each other to form a functional single part. The second valve stem may sometimes be referred to as an inner valve stem. The second valve stem typically extends inside the first valve stem. The second valve stem may be a single piece of material, but it is preferred that it is formed of at least one part forming part of the actuator arrangement and one part forming part of the flow control arrangement, the two or more parts being coupled to each other to form a functional single part. The second valve stem preferably extends all the way through the actuator arrangement in the sense that the control unit is capable of detecting the movement of the second valve stem as the second valve stem extends into the control unit. The second valve stem extending through the actuator arrangement may be a single piece of material or may be formed of two or more parts being interconnected to each other to form a single functional part. It may be noted that the interface between the actuator arrangement and the control unit must not be a planar interface. In this context the interface may be such that a portion of the control unit extends a distance into the major parts of the actuator arrangement or vice versa. In this context there is made use of the fact that the control unit may be provided with internal sensors capable of detecting the position of the second valve stem as long as the interface between the actuator arrangement and the control unit is such that the second valve stem can extend a distance into the control unit such that the position of the second valve stem may be detected by internal sensors of the control unit. Internal sensors refer in this context to sensor being supported by the housing of the control unit and preferably also being positioned inside and being protected by the housing of the control unit. With this design it has been made possible to securely detect that the intended lifting of the first valve member has actually occurred and it has been made possible to detect it without the use of any external sensor connected to the control unit via an electric cable.

In the preferred embodiment, the first valve stem is tubular. However, other shapes forming a hollow structure allowing the second valve stem to extend inside the first valve stem are also conceivable. It is preferred that the first valve stem is a closed tubular shape forming a closed shape together with the first valve member. Such a design allows the second valve stem to in turn be hollow which may be used to drain cleaning fluid, such as water, through the second valve stem through to the bottom of the valve arrangement.

The term "closed state" is herein meant a completely closed state, in which the first valve member is sealingly engaging the first valve seat and the second valve member is sealingly engaging the second valve seat. By the term "sealingly engaging", it should be understood that the respective conduit section is sealed to the extend determined by the intended use. For most cases this means that the respective conduit section is for the intended fluid pressures in practical terms completely sealed such that no fluid may be able to travel between the first and second conduit sections or to/from the respective conduit section.

It should be noted that as the longitudinal direction extends from the control unit towards the flow control arrangement, and that the direction opposite to the longitudinal direction should be interpreted as a direction extending from the flow control arrangement towards the control unit.

With the present disclosure, there is provided a valve arrangement which is capable of detecting the movement of the first valve stem by the control unit. This is achieved due to the design of the actuator arrangement, wherein the first and second valve stems are arranged such that at least a portion of the movement of, or provided to, the first valve stem may be mechanically transferred into a movement of the second valve stem. Thereby, the movement of the first valve member may be indirectly detectable by the control unit by detection of the movement of the second valve stem.

With the present disclosure, there is provided a valve arrangement which is capable of detecting the first cleaning position by indirectly detecting the movement of the first valve stem by the control unit. By being able to detect the first cleaning position, it may be possible to confirm that the first cleaning has been performed. By transferring the movement of the first valve stem into the movement of the second valve stem, the movement of the first valve stem is detectable by the control unit without the need of any external equipment. This may provide for a valve arrangement which is capable of detecting the movement of the first valve stem with an improved feedback safety such that a performed first cleaning mechanism may be verified in a more efficient way. By being able to detect the movement of the first valve stem without the need of any external equipment provides for that a more accurate and efficient detection is achieved with a reduced number of possible sources of error. This may also provide for lower production cost and/or installation cost compared to a valve arrangement comprising external equipment for detecting the movement of the first valve stem as well as fewer equipment that may need maintenance services or the like. It also reduces the risk of improper installation associated with the need to use an external sensor.

In this context it may be noted that the phrase "or provided to" in the phrase "mechanically transfer at least a portion of the movement of, or provided to, the first valve stem into a first movement of the second valve stem" refers to the fact that it does not necessarily need to be that the movement being transferred to the second valve stem is the actual movement of the first valve stem but that it could also be that the movement which is actually transferred is the movement of a member, such as a seat lift piston, which moves the first valve stem, i.e. a transfer of a movement which is provided to the first valve stem.

The present disclosure is advantageous as it allows both the first valve stem and the second valve stem to be moved towards the first cleaning position such that the movement of the first valve stem may be indirectly detectable. However, although both valve members are moved, it is possible to run a production in the second conduit section as the second conduit section is still sealed.

In the first cleaning position, a first cleaning fluid may be introduced in the first conduit section to clean the first conduit section, first valve member and first valve seat. In the first cleaning position, the first valve member may be arranged to expose the first valve seat during a predetermined time period. In the first cleaning position, the first valve member may be arranged to be moved back and forth in relation to the first valve seat one or more times. Preferably, if the first valve member is moved back and forth more than once, a pulsating movement may be provided such that a turbulent flow of the cleaning fluid occurs. By providing a turbulent flow of the cleaning fluid a more efficient cleaning of the first conduit section, the first valve member and the first valve seat may be achieved.

Further, the valve arrangement may e.g. be used within the food industry and by reducing the number of external equipment as well as providing a more efficient, accurate and secure detection of the first cleaning position, a valve arrangement with an improved hygiene design is achieved.

The first and the second conduit section may each extend in a transverse direction The first and the second conduit section may each be configured to allow a respective flow of a fluid in a transverse direction. Thus, the first and the second conduit section may each extend in and be configured to allow a respective flow of a fluid in a transverse direction.

In this context it may be noted that it is preferred that the movement of the second valve stem when the valve arrangement is set in the first cleaning position is different from the movement of the second valve stem when the valve arrangement is set in an open position or open state. Thus, in an open position of the double valve, or more precisely when setting in an open position, or even more precisely when moving from the closed state to an open position, in which the first valve member and the second valve member has been moved into the first conduit to thereby open the mixing opening and allowing fluid to flow between the first and second conduit, the second valve stem has been moved a second movement in a direction opposite to the longitudinal direction and towards the control unit, the first movement of the second valve stem having a stroke preferably being different from, and more preferably being shorter than, the second movement of the second valve stem. Thus, the movement of the second valve stem is shorter when setting it in the first cleaning position compared to the movement of the second valve stem when setting it in the open position.

The open position may be an open position of the valve arrangement, and/or an open position of the actuator arrangement and/or of the flow control arrangement, such as of the double valve.

The valve arrangement may be set in the open position, and/or the actuator arrangement and/or the flow control arrangement, such as the double valve, may be set in the open position. The valve arrangement may be moved from the closed state to the open position, and/or the actuator arrangement and/or the flow control arrangement, such as the double valve, may be moved from the closed state to the open position.

The movement of the second valve stem may be greater than the movement of the first valve stem when the double valve is moved from the closed state to the first cleaning position. This could be useful if there is a desire to keep the first valve member close to the valve seat e.g. to reduce water consumption in the cleaning procedure while still securing that there is a sufficient movement of the second valve stem such that the control unit may securely detect the movement.

The movement of the second valve stem may be less than the movement of the first valve stem when the double valve is moved from the closed state to the first cleaning position. This allows for a significant movement of the first valve stem and first valve member from the first valve seat while still only requiring a small movement of the second valve member. However, the movement of the second valve stem still needs to be big enough to securely be detected by the control unit.

Differences in the movement of the first and second valve stem may e.g. be provided by the parts abutting each other such that there is a play before the abutment occurs and/or that one of the parts encounters a step and the other part may continue its movement.

The movement of the second valve stem may be equal to the movement of the first valve stem when the double valve is moved from the closed state to the first cleaning position. This may be useful if there is a desire to connect the first and second valve stems in such a manner that it is possible detect the actual position of the first valve member based on the actual position of the second valve stem.

The actuator arrangement may, in order to set the flow control arrangement, such as the double valve, in the first cleaning position, or more precisely in order to move the flow control arrangement, such as the double valve, into the first cleaning position, comprise a first cylinder and piston arrangement comprising a main cylinder and a seat lift piston inside the main cylinder, the seat lift piston being configured to be moved in the main cylinder in the direction opposite to the longitudinal direction and thereby move the first valve stem in the direction opposite to the longitudinal direction. The seat lift piston may be operated by the control unit controlling supply of pressurised air acting on one side of the seat lift piston. This makes it possible to provide a strong and distinct movement of the first valve stem and thereby also of the first valve member connected to the first valve stem.

The main cylinder may be provided with a stop defining an end position of the movement of the seat lift piston in the main cylinder in the direction opposite to the longitudinal direction, the stop being positioned such that the end position of the seat lift piston corresponds to the second valve member having reached the first cleaning position. Thereby it is possible to accomplish a distinct and correct positioning of the first valve member and of the second valve member such that the intended cleaning may be accomplished while the desired sealing engagement between the second valve member and the second valve seat is maintained.

The seat lift piston may be provided with an abutment surface facing in the direction opposite the longitudinal direction and being configured to abut a portion of the first valve stem such that the seat lift piston is capable of moving the first valve stem in the direction opposite the longitudinal direction, such that the first valve stem is separably connected to the seat lift piston such that the first valve stem is further movable in the direction opposite to the longitudinal direction even though the seat lift piston has reached its end position. This facilitates the provision of a securely manoeuvrable first valve stem capable of being positioned both in a first cleaning position in which the first valve member has moved a comparably small distance into the first conduit and in an open position where the first valve member has moved a comparably large distance into the first conduit thereby providing sufficient space for the second valve member to also move sufficiently into the first conduit such that the mixing opening is sufficiently opened.

A protruding portion may be arranged on the seat lift piston of the first cylinder and piston arrangement, the protruding portion protruding from the seat lift piston in the direction opposite to the longitudinal direction. The protruding portion may be used to mechanically transmit movement of the seat lift piston such that another member, a member other than the first valve stem, may be moved a distance in the same direction as the seat lift piston.

The protruding portion is preferably configured to act on a member connected to the second valve stem. In the preferred embodiment, the member connected to the second valve stem is a ring-shaped portion extending radially outwardly from the valve stem. The member may be a separate part attached to the second valve stem or may be integrally formed with the second valve stem.

The protruding portion may have an extension such that when the valve arrangement is in the closed state there is a gap or play along, or more precisely in, the direction opposite to the longitudinal direction between the protruding portion and the member connected to the second valve stem. The provision of such a play is beneficial since it reduces the risk that the seat lift piston interferes with the intended positioning of the member upon which the protrusion of the seat lift piston works. If e.g. the second valve stem is connected to a spring intended to keep the second valve stem in the closed state, when there is no air connected to the seat lift piston or to a piston lifting both the first and second valve stems to an open position, the play allows the seat lift piston to be pushed by the second valve stem until the second valve stem reaches the intended closed position and thereafter the seat lift piston may still move freely further along, or more precisely in, the longitudinal direction.

The movement of the second valve stem may be equal to the movement of the first valve stem when the double valve is moved from the closed state to the first cleaning position. To provide this, preferably the gap or play between the protruding portion and the member connected to the second valve stem is equal to a gap or play between the seat lift piston and the first valve stem. Thus, when the seat lift piston is lifted by the pressurized air, the seat lift piston will come into contact with both the first valve stem and the second valve stem simultaneously. The seat lift piston will then continue and lift both the first valve stem and the second valve stem until the seat lift position hits its associated the stop. The total movement of the seat lift piston is defined by a gap or play between the seat lift piston and its associated stop.

Alternatively, the movement of the second valve stem may be greater than the movement of the first valve stem when the double valve is moved from the closed state to the first cleaning position. This could e.g. be accomplished by designing the protrusion such that the gap or play between the protruding portion and the member connected to the second valve stem becomes smaller than the gap or play between the seat lift piston and the first valve stem. Thereby, in the movement of the seat lift piston, the seat lift piston will start moving the second valve stem first and until the remaining portion of the play between the seat lift piston and the first valve stem. has been overcome, the first valve stem will remain unaffected. The total movement of the seat lift piston is defined by a gap or play between the seat lift piston and its associated stop.

Alternatively, the movement of the second valve stem may be less than the movement of the first valve stem when the double valve is moved from the closed state to the first cleaning position. This could e.g. be accomplished by designing the protrusion such that the gap or play between the protruding portion and the member connected to the second valve stem becomes greater than the gap or play between the seat lift piston and the first valve stem. Thereby, in the movement of the seat lift piston, the seat lift piston will start moving the first valve stem first and until the remaining portion of the play between the protruding portion and the member connected to the second valve stem has been overcome, the second valve stem will remain unaffected. The total movement of the seat lift piston is defined by a gap or play between the seat lift piston and its associated stop.

The valve arrangement may further comprise
- a main piston movable back and forth along the longitudinal direction inside the main cylinder, the main piston having an inner envelope surface forming an inner cylinder for an inner piston connected to the second valve stem,
- a first spring arranged inside the inner cylinder formed of the main piston and between the inner piston and the first valve stem or the seat lift piston, and
- a second spring arranged inside the inner cylinder formed of the main piston and between the inner piston and a longitudinally facing inside end surface of the inner cylinder formed by the main piston,
- wherein the first spring is stronger than the second spring such that the first spring transfers a movement of the seat lift piston, preferably via the first valve stem, to the inner piston and the second spring allows movement of the inner piston in a direction opposite the longitudinal direction relative to the inner cylinder formed of the main piston.

By providing this set-up with first and second springs inside an inner cylinder formed of a main piston and by balancing the strengths of the first and the second springs, there is accomplished a system where the main piston may be used to lift the valve stems to accomplish opening of both valve members, and where both the first valve stem and the second valve stem may be moved in the direction opposite the longitudinal direction to reach a first cleaning position while still allowing the second valve stem to move also along, or more precisely in, the longitudinal direction relative to the main piston such that a second cleaning position in which the second valve seat is exposed and the second valve member, the second valve seat and the second conduit are cleaned.

In a second cleaning position, or more precisely when setting in a second cleaning position, or even more precisely when moving from the closed state to a second cleaning position, in which the second conduit, the second valve member and the second valve seat are to be cleaned, the second valve stem may have been moved a third movement in the longitudinal direction and away from the control unit.

The second spring may have a stroke length to a maximum possible compression which is greater than an allowable movement of the second valve member while remaining in the closed state such that the second valve member is movable into the first cleaning position. The allowable movement of the second valve member may e.g. be controlled by a stop, such as the stop defining the maximum movement of the seat lift piston. This secures that the second spring does not interfere with the intended positioning of the second valve stem and the second valve member in the first cleaning position.

The first spring may be pre-tensioned by being connected to a mechanical arrangement which sets a maximum length of the first spring which maximum length is shorter than a free length of the first spring, the mechanical arrangement still allowing the first spring to be further compressed relative to the maximum length set by the mechanical arrangement. In the preferred embodiment, the mechanical arrangement is a cage formed of telescopically arranged sleeves. However, also other designs of the mechanical arrangement are conceivable. The mechanical arrangement could e.g. comprise two end pieces, such as two discs, interconnected by a set of circumferentially distributed wires, or the like. Alternatively, the mechanical arrangement could comprise two end pieces interconnected by and slidable arranged along one or more bolts having heads limiting the maximum distance between the two end pieces.

The valve arrangement may further comprise a main spring arranged inside the main cylinder and being configured to bias the main piston in the longitudinal direction. This main spring may be configured to keep the first and second valve stems and thereby the first and second valve members in the closed position when no air is supplied to the valve arrangement.

The above mentioned object has also been achieved by an actuator arrangement configured to be connected on one side to a control unit and on another side be connected to a flow control arrangement such that the actuator arrangement is controlled by the control unit and is in turn configured to control the flow control arrangement, the actuator arrangement comprising:
a first valve stem extending along a longitudinal direction intended to face towards the flow control arrangement and being configured to be connected to and control movement of a first valve member of the flow control arrangement,
a second valve stem extending along the longitudinal direction and being configured to be connected to and control movement of a second valve member of the flow control arrangement, wherein the first valve stem is hollow and the second valve stem extends inside the first valve stem, and wherein the second valve stem extends through the actuator arrangement such that it can extend into the control unit connected to the actuator arrangement thereby allowing the control unit to detect the position of the second valve stem along the longitudinal direction,
wherein in a first cleaning position, or more precisely when setting in a first cleaning position, or even more precisely when moving from the closed state to a first cleaning position, the first valve stem is configured to move in a direction opposite the longitudinal direction,
wherein in the first cleaning position, or more precisely when setting in the first cleaning position, or even more precisely when moving from the closed state to the first cleaning position, the actuator arrangement is configured to mechanically transfer at least a portion of the movement of, or provided to, the first valve stem into a first movement of the second valve stem, whereby the movement of the first valve member is detectable by the control unit by detection of the first movement of the second valve stem in a direction opposite to the longitudinal direction and towards the control unit.

The different features of the actuator arrangement have been discussed above with reference to the valve arrangement including an actuator arrangement, and that discussion is equally applicable to the features in connection with the actuator arrangement as such and reference is therefor made to that discussion. The different preferred embodiments of the valve arrangement disclosed above and as also disclosed in the detailed description are equally applicable to the actuator arrangement as such.

As mentioned directly above, the above mentioned object has been achieved by an actuator arrangement configured to be connected on one side to a control unit and on another side be connected to a flow control arrangement such that the actuator arrangement is controlled by the control unit and is in turn configured to control the flow control arrangement.

The flow control arrangement configured to be connected to the actuator arrangement preferably comprises a first and a second conduit section each being configured to allow a respective flow of a fluid and being arranged beside each other as seen along a longitudinal direction, wherein the two conduit sections are fluidly interconnected by a mixing opening being selectively closable and openable by a double valve formed by a first and a second valve member, wherein in a closed state of the double valve, the first and second valve members are sealingly engaging a first and a second valve seat, respectively, each valve seat extending around the mixing opening, and the first and second valve members are movable relative to each other to allow selective cleaning of the first respectively the second conduit section, of the first respectively the second valve member, and of the first respectively second valve seat. In this context the features of the actuator arrangement may be clarified in connection with such a flow control arrangement. The actuator arrangement comprises:
a first valve stem extending along the longitudinal direction intended to face towards the flow control arrangement and being configured to be connected to and control movement of the first valve member of the flow control arrangement,
a second valve stem extending along the longitudinal direction and being configured to be connected to and control movement of the second valve member of the flow control arrangement, wherein the first valve stem is hollow and the second valve stem extends inside the first valve stem, and wherein the second valve stem extends through the actuator arrangement such that it can extend into the control unit connected to the actuator arrangement thereby allowing the control unit to detect the position of the second valve stem along the longitudinal direction,
wherein in a first cleaning position, or more precisely when setting in a first cleaning position, or even more precisely when moving from the closed state to a first cleaning position, in which the first conduit, the first valve member and first valve seat are to be cleaned, the first valve stem is configured to provide a movement of the first valve member into the first conduit thereby exposing the first valve seat,
wherein in the first cleaning position, or more precisely when setting in the first cleaning position, or even more precisely when moving from the closed state to the first cleaning position, the actuator arrangement is configured to mechanically transfer at least a portion of the movement of, or provided to, the first valve stem into a first movement of the second valve stem, such that the second valve member is moved towards the first conduit while the second valve member still sealingly engages the second valve seat, whereby the movement of the first valve member is detectable by the control unit by detection of the first movement of the second valve stem in a direction opposite to the longitudinal direction and towards the control unit. The first valve seat is exposed in the first cleaning position. The second valve member sealingly engages the second valve seat in the first cleaning position.

This it may alternatively be said that above object is achieved by an actuator arrangement configured to be connected on one side to a control unit and on another side be connected to a flow control arrangement such that the actuator arrangement is controlled by the control unit and is in turn configured to control the flow control arrangement, the flow control arrangement comprising a first and a second conduit section each being configured to allow a respective flow of a fluid and being arranged beside each other as seen along a longitudinal direction, wherein the two conduit sections are fluidly interconnected by a mixing opening being selectively closable and openable by a double valve formed by a first and a second valve member, wherein in a closed state of the double valve, the first and second valve members are sealingly engaging a first and a second valve seat, respectively, each valve seat extending around the mixing opening, and the first and second valve members are movable relative to each other to allow selective cleaning of the first respectively the second conduit section, of the first respectively the second valve member, and of the first respectively second valve seat, the actuator arrangement comprising:
a first valve stem extending along the longitudinal direction intended to face towards the flow control arrangement and being configured to be connected to and control movement of the first valve member of the flow control arrangement,
a second valve stem extending along the longitudinal direction and being configured to be connected to and control movement of the second valve member of the flow control arrangement, wherein the first valve stem is hollow and the second valve stem extends inside the first valve stem, and wherein the second valve stem extends through the actuator arrangement such that it can extend into the control unit connected to the actuator arrangement thereby allowing the control unit to detect the position of the second valve stem along the longitudinal direction,
wherein in a first cleaning position, or more precisely when setting in a first cleaning position, or even more precisely when moving from the closed state to a first cleaning position, in which the first conduit, the first valve member and first valve seat are to be cleaned, the first valve stem is configured to provide a movement of the first valve member into the first conduit thereby exposing the first valve seat,
wherein in the first cleaning position, or more precisely when setting in the first cleaning position, or even more precisely when moving from the closed state to the first cleaning position, the actuator arrangement is configured to mechanically transfer at least a portion of the movement of, or provided to, the first valve stem into a first movement of the second valve stem, such that the second valve member is moved towards the first conduit while the second valve member still sealingly engages the second valve seat, whereby the movement of the first valve member is detectable by the control unit by detection of the first movement of the second valve stem in a direction opposite to the longitudinal direction and towards the control unit. The first valve seat is exposed in the first cleaning position. The second valve member sealingly engages the second valve seat in the first cleaning position.

In this context it may also be noted that it is advantageous to provide the actuator arrangement and the flow control arrangement as a unit or at least as a kit of parts. Thus, the above mentioned object is also achieved by a kit of parts, preferably preinstalled as a single unit, comprising:
actuator arrangement, and
a flow control arrangement,
wherein the actuator arrangement is configured to be connected on one side to a control unit and on another side be connected to the flow control arrangement such that the actuator arrangement is controlled by the control unit and is in turn configured to control the flow control arrangement, the flow control arrangement comprising:
a first and a second conduit section each being configured to allow a respective flow of a fluid and being arranged beside each other as seen along a longitudinal direction, wherein the two conduit sections are fluidly interconnected by a mixing opening being selectively closable and openable by a double valve formed by a first and a second valve member, wherein in a closed state of the double valve, the first and second valve members are sealingly engaging a first and a second valve seat, respectively, each valve seat extending around the mixing opening, and the first and second valve members are movable relative to each other to allow selective cleaning of the first respectively the second conduit section, of the first respectively the second valve member, and of the first respectively second valve seat, the actuator arrangement comprising:
a first valve stem extending along the longitudinal direction intended to face towards the flow control arrangement and being configured to be connected to and control movement of the first valve member of the flow control arrangement,
a second valve stem extending along the longitudinal direction and being configured to be connected to and control movement of the second valve member of the flow control arrangement, wherein the first valve stem is hollow and the second valve stem extends inside the first valve stem, and wherein the second valve stem extends through the actuator arrangement such that it can extend into the control unit connected to the actuator arrangement thereby allowing the control unit to detect the position of the second valve stem along the longitudinal direction,
wherein in a first cleaning position, or more precisely when setting in a first cleaning position, or even more precisely when moving from the closed state to a first cleaning position, in which the first conduit, the first valve member and first valve seat are to be cleaned, the first valve stem is configured to provide a movement of the first valve member into the first conduit thereby exposing the first valve seat,
wherein in the first cleaning position, or more precisely when setting in the first cleaning position, or even more precisely when moving from the closed state to the first cleaning position, the actuator arrangement is configured to mechanically transfer at least a portion of the movement of, or provided to, the first valve stem into a first movement of the second valve stem, such that the second valve member is moved towards the first conduit while the second valve member still sealingly engages the second valve seat, whereby the movement of the first valve member is detectable by the control unit by detection of the first movement of the second valve stem in a direction opposite to the longitudinal direction and towards the control unit. The first valve seat is exposed in the first cleaning position. The second valve member sealingly engages the second valve seat in the first cleaning position.

The above mentioned object has also been achieved in accordance with a method for detecting a first cleaning position in a valve arrangement, the method comprising:
providing a movement of a first valve stem in order to move a first valve member into a first conduit thereby exposing a first valve seat extending around a mixing opening and being associated with a first valve member, mechanically transferring the movement of, or provided to, the first valve stem into a movement of a second valve stem thereby moving the second valve member towards the first conduit while the second valve member still sealingly engages a second valve seat extending around the mixing opening and being associated with the second valve member, and indirectly detecting the movement of the first valve steam by a control unit detecting the movement of the second valve stem in a direction opposite to a longitudinal direction and towards the control unit.

In this context it may further be noted that it is also advantageous to provide the control unit and the actuator arrangement as a unit or at least as a kit of parts configured to be connected to a flow control arrangement, the flow control arrangement preferably being of the kind disclosed in general terms above, optionally according to the more detailed description presented below. Thus, the above mentioned object is also achieved by a kit of parts, preferably preinstalled as a single unit, comprising:

an actuator arrangement, and
a control unit.

The method for detecting a first cleaning position in a valve arrangement is preferably performed in a valve arrangement of the kind disclosed above.

The different features of the method for detecting a first cleaning position in a valve arrangement have been discussed above with reference to the valve arrangement, and that discussion is equally applicable to the features in connection with this method and reference is therefor made to that discussion. The different preferred embodiments of the valve arrangement disclosed above and as also disclosed in the detailed description are equally applicable to the method for detecting a first cleaning position in a valve arrangement.

The above mentioned object has also been achieved in accordance with a method for detecting a first cleaning position in an actuator arrangement, the method comprising:

providing a movement of a first valve stem in order to move a first valve member into a first conduit thereby exposing a first valve seat extending around a mixing opening and being associated with the first valve member, mechanically transferring the movement of, or provided to, the first valve stem into a movement of a second valve stem thereby moving a second valve member towards the first conduit while the second valve member still sealingly engages a second valve seat extending around the mixing opening and being associated with the second valve member, and thereby allowing the movement of the first valve steam to be indirectly detected by a control unit detecting the movement of the second valve stem in a direction opposite to a longitudinal direction and towards the control unit.

The method for detecting a first cleaning position in an actuator arrangement is preferably performed in in an actuator arrangement of the kind disclosed above.

The different features of the method for detecting a first cleaning position in an actuator arrangement have been discussed above with reference to the valve arrangement, and that discussion is equally applicable to the features in connection with this method and reference is therefor made to that discussion. The different preferred embodiments of the valve arrangement disclosed above and as also disclosed in the detailed description are equally applicable to the method for detecting a first cleaning position an actuator arrangement.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

The invention may also in short be said to relate to a valve arrangement, an actuator arrangement and related methods, in which a first cleaning position is detected by mechanically transfer at least a portion of a movement of, or provided to, a first valve stem into a first movement of a second valve stem, such that a second valve member is moved towards a first conduit while the second valve member still sealingly engages a second valve seat, whereby a movement of a first valve member is detectable by a control unit by detection of the first movement of the second valve stem in a direction which extends towards the control unit.

BRIEF DESCRIPTION OF THE DRAWINGS

The invention will by way of example be described in more detail with reference to the appended schematic drawings, which shows a presently preferred embodiment of the invention.

FIGS. 3A and 3B discloses in a cross-sectional view the internal parts and their positions inside the actuator arrangement and inside the flow control arrangement in a closed state of the flow control arrangement.

FIGS. 7A and 7B disclose on the left hand side figures the internal parts and their positions inside the actuator arrangement and inside the flow control arrangement with the flow control arrangement in the closed state and disclose on the right hand side the same with the flow control arrangement in the first cleaning position.

DETAILED DESCRIPTION OF PREFERRED EMBODIMENTS

Figure 1:
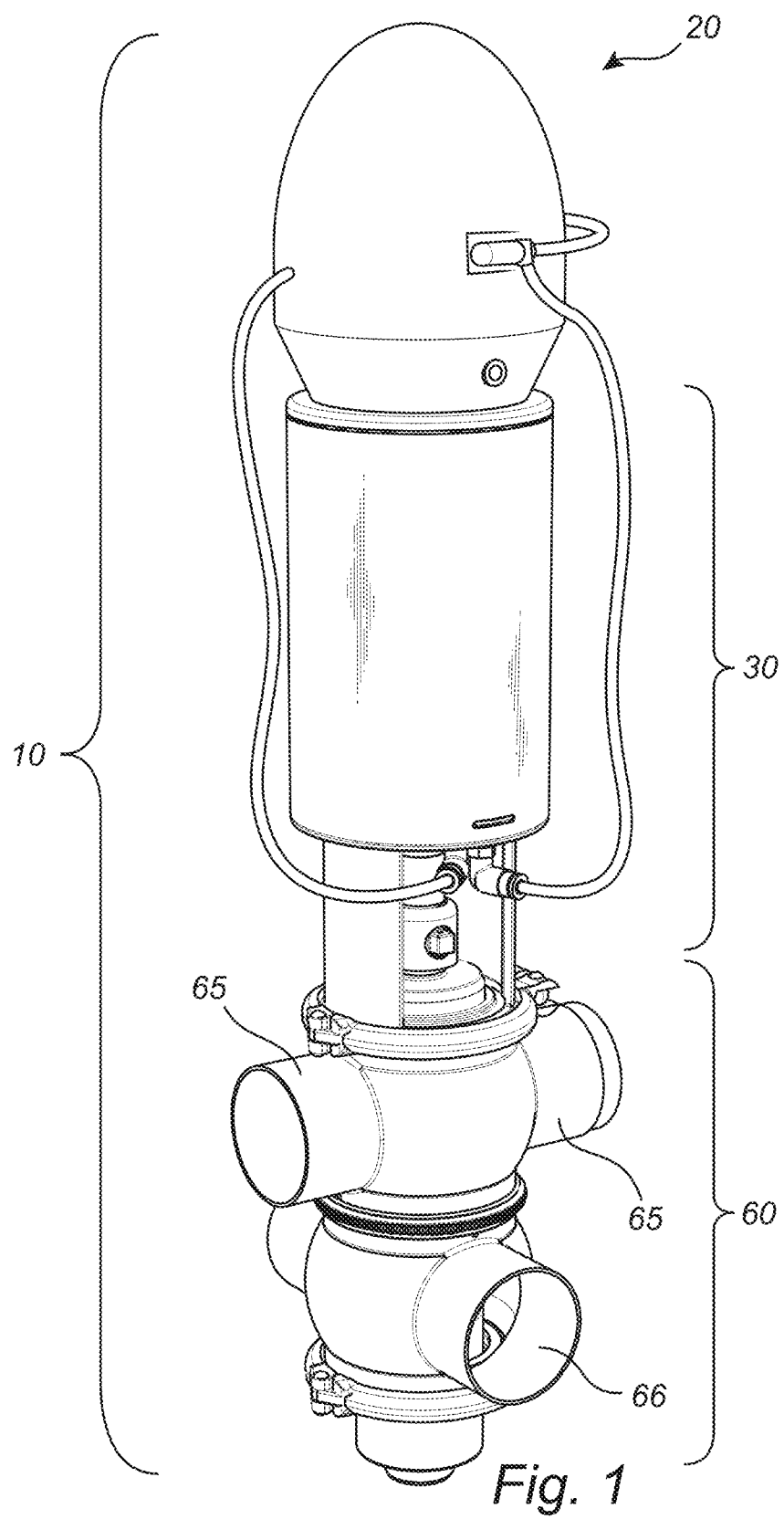
FIG. 1 discloses a valve arrangement comprising a control unit, an actuator arrangement, and a flow control arrangement.
Figure 2:
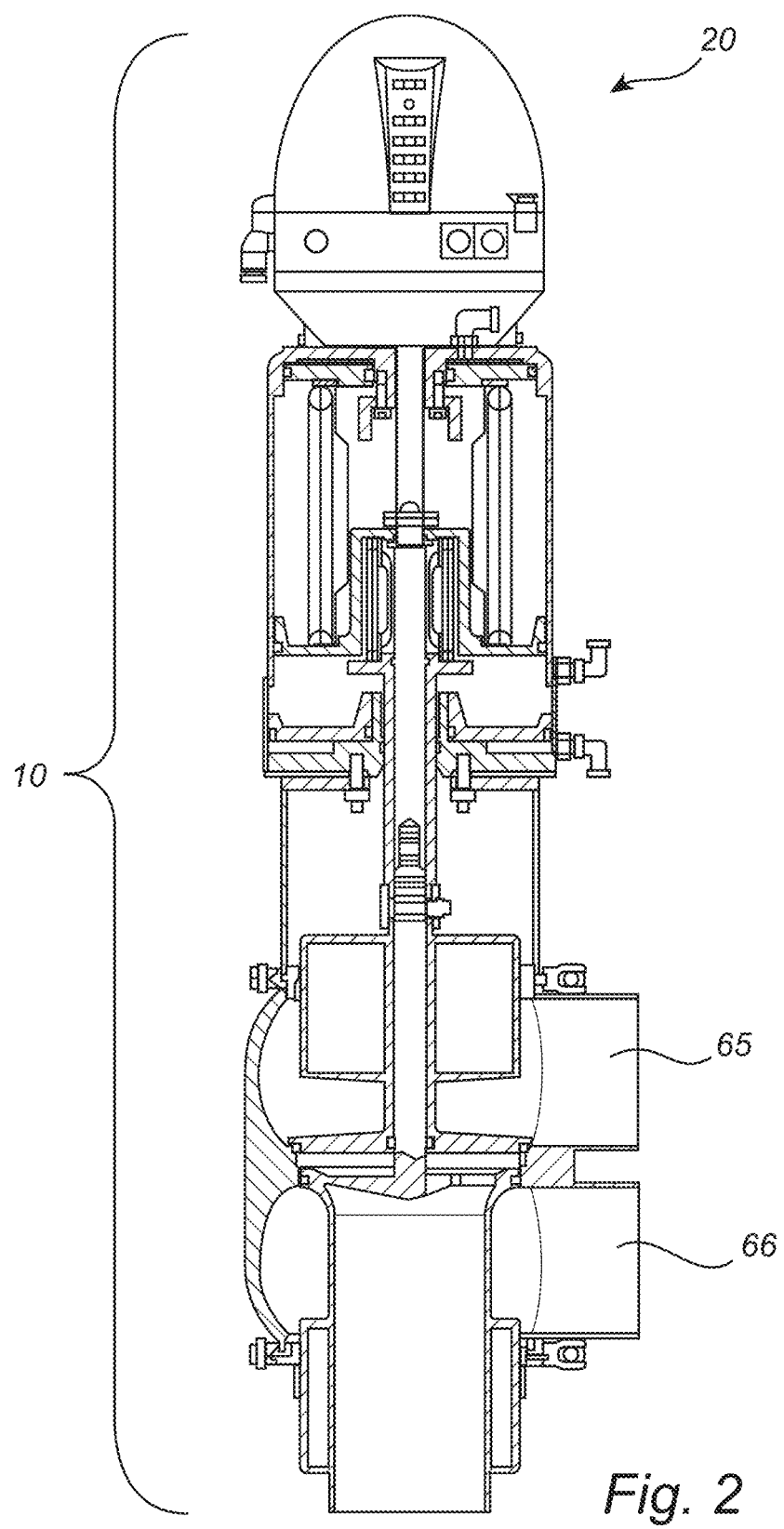
FIG. 2 discloses in cross-section a valve arrangement comprising a control unit, an actuator arrangement, and a flow control arrangement with a slightly different flow control arrangement compared to the one shown in FIG. 1 and with a conventional actuator arrangement.

With reference to FIGS. 1 and 2, there is disclosed a valve arrangement 10 comprising a control unit 20, an actuator arrangement 30, and a flow control arrangement 60. The actuator arrangement 30 is controlled by the control unit 20 and controls in turn the flow control arrangement 60. In short, the system may be described in accordance with the following. Pressurised air is supplied to the control unit 20 and internal, electronically controlled air valves in the control unit 20 controls supply of the pressurised air to different pistons in the actuator arrangement 30. Different parts of the actuator arrangement 30 are on one hand connected to or at least affected by the different pistons and are on the other hand connected to valve members of the flow control arrangement 60. The design of the actuator arrangement 30 and how it is connected to and how it affects the flow control arrangement 60 will be described in detail below.

As e.g. shown in FIGS. 1, 2 and 3B, the flow control arrangement 60 comprises a first and a second conduit section 65, 66 each extending in and being configured to allow a respective flow of a fluid in a transverse direction T1, T2 and being arranged beside each other as seen along a longitudinal direction L. As e.g. shown in FIG. 4B, the two conduit sections 65, 66 are fluidly interconnected by a mixing opening 67 being selectively closable and openable by a double valve formed by the first and second valve members 61, 62. In FIG. 3B, both the first and second valve members 61, 62 are in a closed state and the double valve is said to be in a closed state. When the double valve is in the closes state, there is no fluid contact between the first and second conduit 65, 66 and both the first and the second valve member 61, 62 sealing engages its respective valve seat 63, 64. The valve seats 63, 64 are best shown in FIG. 4B.

Figure 4B:
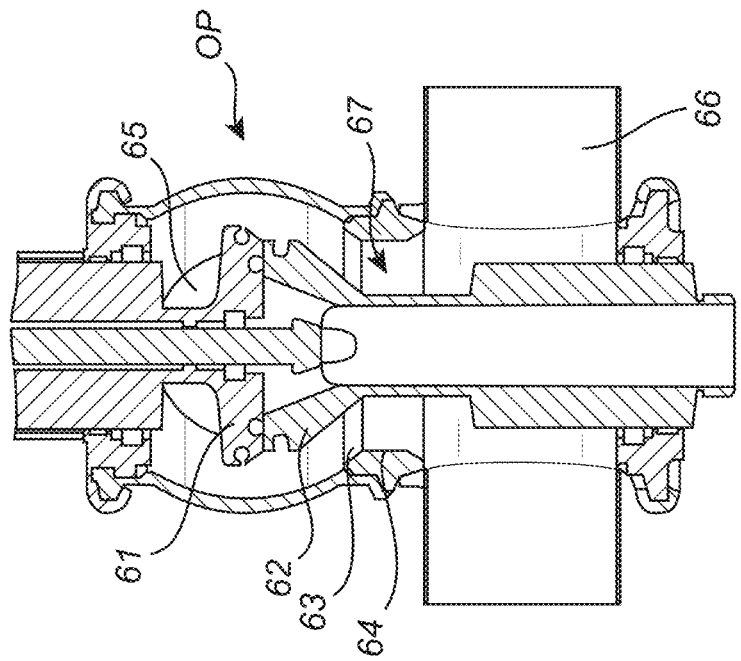
FIGS. 4A and 4B discloses in a cross-sectional view the internal parts and their positions inside the actuator arrangement and inside the flow control arrangement in an open position of the flow control arrangement.

In FIG. 4B, both the first and second valve members 61, 62 are in an open state and the double valve is said to be in an open state. Both the first and the second valve member 61, 62 have been moved into the first conduit 65 such that none of the valve members 61, 62 is in contact with its respective valve seat 63, 64.

It is to be noted that in the flow control arrangement 60 shown in the figures, the first and the second conduit sections each extends in a transverse direction T1, T2 and thereby allows a respective flow of a fluid in the transverse directions T1, T2. The transverse directions T1 and T2 are transverse in relation to the longitudinal direction L. However, in this context it may be noted that the conduit sections 65, 66 may have numerous different configurations when it comes to their extension. The conduit sections may, independent of each other, extend in a direction having a component in the longitudinal direction L and/or the direction L' opposite to the longitudinal direction. The conduit sections may, independent of each other, extend in a direction having a component in a transverse direction T1, T2, i.e. in a transverse direction T1, T2 being transverse in relation to the longitudinal direction L. The conduit sections may, independent of each other, extend in a direction having a component in the longitudinal direction L and/or the direction L' opposite to the longitudinal direction as well as a component in a transverse direction T1, T2, i.e. in a transverse direction T1, T2 being transverse in relation to the longitudinal direction L. The conduit sections may, independent of each other, be bent or straight. When it comes to the extension of the conduit sections 65, 66 in the transverse direction or directions T1, T2, the conduit sections 65, 66 may e.g. both extend along straight lines and extend in parallel with each other, i.e. both extending in one and the same transverse direction. They may both extend along straight lines but along different transverse directions. The two transverse directions may form any angle relative to each other. One, or both, of the conduit sections may alternatively be bent such that the inlet portion of the conduit section extends along a first transverse direction and the outlet portion of the conduit section extends along a second transverse direction, being different from the first transverse direction.

Figure 5A:
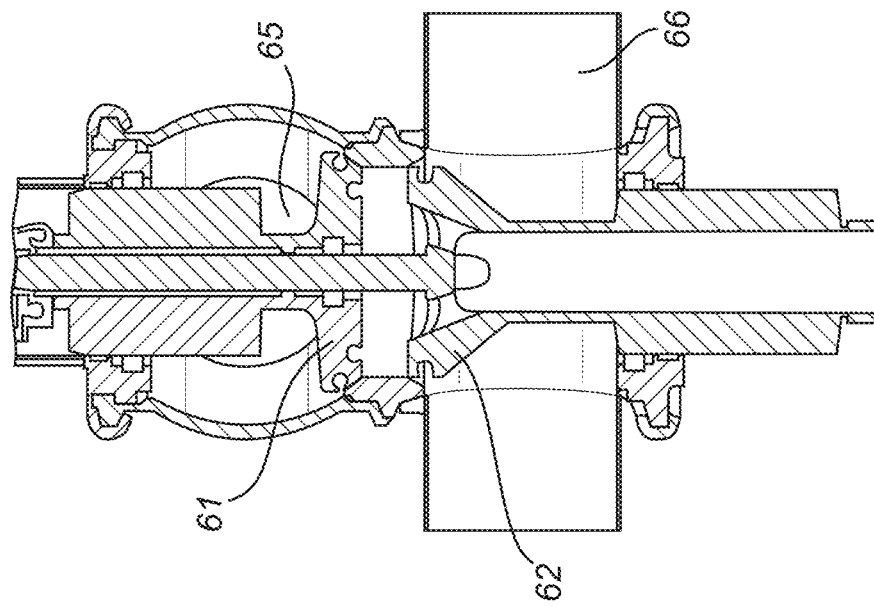
FIGS. 5A and 5B discloses in a cross-sectional view the internal parts and their positions inside the actuator arrangement and inside the flow control arrangement in a cleaning position, referred herein to as the second cleaning position, of the flow control arrangement, in which second cleaning position the lower conduit and the associated valve may be cleaned.
Figure 5B:
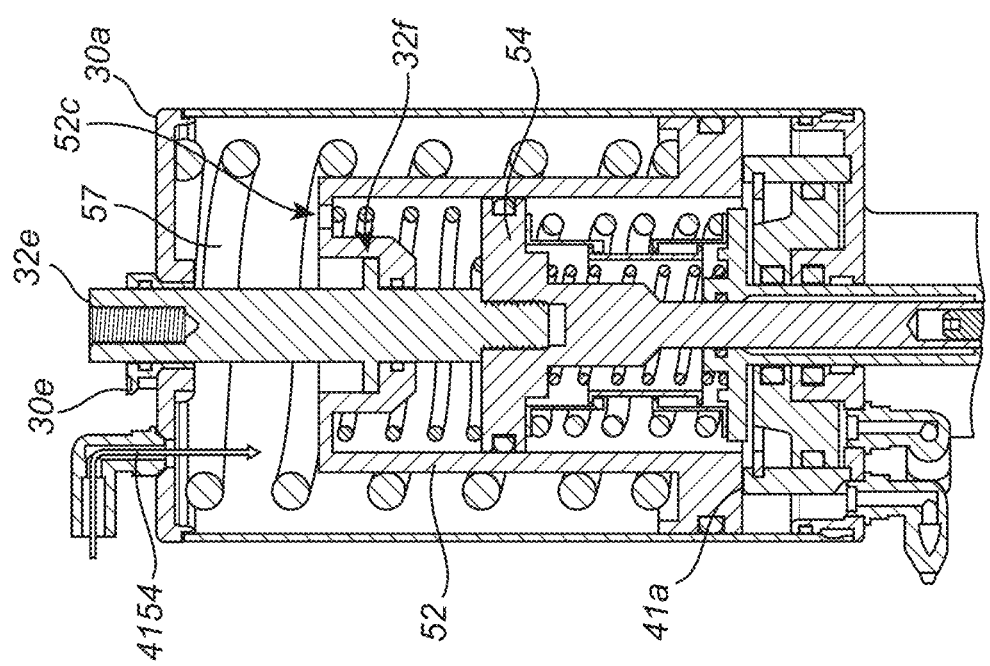

In FIG. 5B, the second valve member 62 has been pushed a short distance into the second conduit 66 thereby exposing the second valve seat 64 associated with the second valve member 62. The first valve member 61 remains in contact with the first valve seat 63 and the mixing opening 67 thereby still remains closed. Thus, there is no fluid connection between the first and the second conduits 65, 66. With the valve members 61, 62 in these positions, the second conduit 66, the second valve 62 and the second valve seat 64 may be cleaned. This will herein be referred to as a second cleaning position CP2.

Figure 6B:
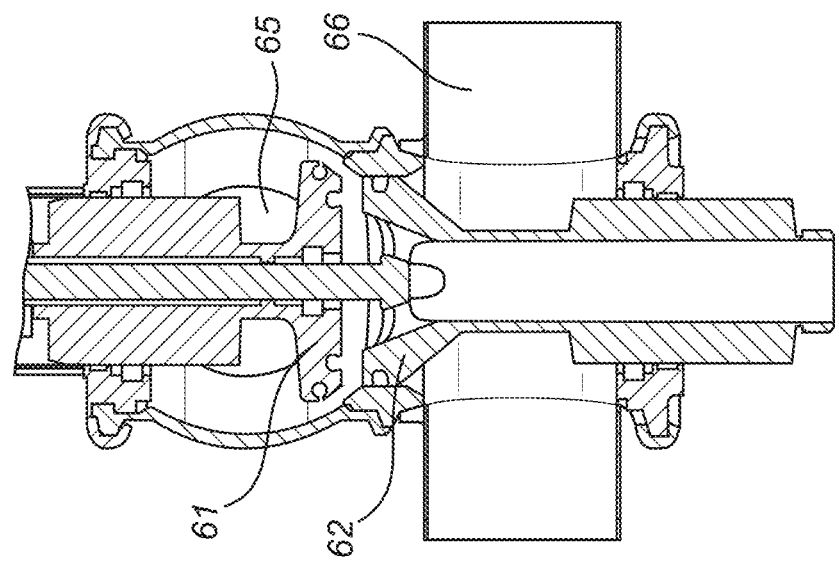
FIGS. 6A and 6B discloses in a cross-sectional view the internal parts and their positions inside the actuator arrangement and inside the flow control arrangement in a cleaning position, referred herein to as the first cleaning position, of the flow control arrangement, in which first cleaning position the lower conduit and the associated valve may be cleaned.

In FIG. 6B, the first valve member 61 has been lifted a short distance into the first conduit 65 thereby exposing the first valve seat 63 associated with the first valve member 61. The second valve member 62 remains in contact with the second valve seat 64 and the mixing opening 67 thereby still remains closed. The second valve seat 64 is preferably shaped as a cylinder along the longitudinal direction L such that the second valve 62 may move along the longitudinal direction L and still remain in sealing contact with the valve seat 64. It may in this context be noted that the first valve seat 63 may have a different shape since there is no reason to allow the first valve 61 to move along the first valve seat 63 while remaining in sealing contact with the first valve seat 63. Thus, there is no fluid connection between the first and the second conduits 65, 66. With the valve members 61, 62 in these positions, the first conduit 65, the first valve 61 and the first valve seat 63 may be cleaned. This will herein be referred to as a first cleaning position CP1. It may in this context by noted that the second valve member 62 has also been lifted a short distance towards the first conduit 65 but that the second valve member 62 still remains in contact with the second valve seat 64 and thereby still closes off the mixing opening 67.

Thus, in summary, in a closed state of the double valve, the first and second valve members 61, 62 are sealingly engaging a first and a second valve seat 63, 64, respectively, wherein each valve seat 63, 64 extends around the mixing opening 67. The first and second valve members 61, 62 are movable relative to each other to allow selective cleaning of the first respectively the second conduit section 65, 66, of the first respectively the second valve member 61, 62, and of the first respectively the second valve seat 63, 64.

The actuator arrangement 30 is designed to manoeuvre the valve members 61, 62 between these four different states; the closed state shown in FIG. 3B, the open state shown in FIG. 4B, the second cleaning position CP2 shown in FIG. 5B, and the first cleaning position CP1 shown in FIG. 6B.

With reference to FIGS. 3A, 4A, 5A, and 6A, the actuator arrangement 30 comprises a first valve stem 31 extending along a longitudinal direction L towards the flow control arrangement 60. The first valve stem 31 is connected to or is configured to be connected to and control movement of the first valve member 61 of the flow control arrangement 60.

The actuator arrangement 30 comprises a second valve stem 32 extending along the longitudinal direction L towards the flow control arrangement 60. The second valve stem 32 is connected to or is configured to be connected to and control movement of the second valve member 62 of the flow control arrangement 60

The first valve stem 31 is hollow and the second valve stem 32 extends inside the first valve stem 31.

The second valve stem 32 extends through the actuator arrangement 30 and into the control unit 20 such that the control unit 20 is capable of detecting the position of the second valve stem 32 along the longitudinal direction L.

It this context it may be noted that the end 32e of the second valve member 32 extends different distances from the upper part 30e of a housing 30a of the actuator arrangement 30 in each of the four positions; the closed state, the open state, the second cleaning position, respectively the first cleaning position.

Since an object of the invention is to address an issue related to the first cleaning position CP1, the detailed description will primarily focus on how this is accomplished.

As briefly mentioned above, and as disclosed in detail in FIGS. 6A and 6B, in a first cleaning position CP1, or more precisely when setting in a first cleaning position CP1, or even more precisely when moving from the closed state to a first cleaning position CP1, in which the first conduit 65, the first valve member 61 and first valve seat 63 are to be cleaned, the first valve stem 31 is configured to provide a movement of the first valve member 61 into the first conduit 65 thereby exposing the first valve seat 63.

Figure 6A:
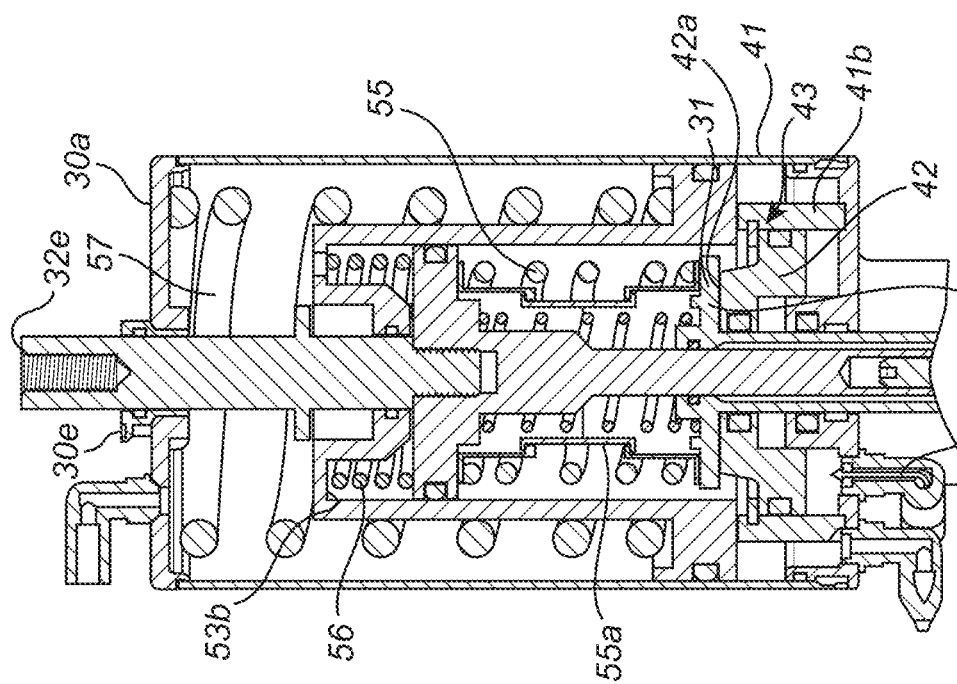

As shown in FIG. 6A, in the first cleaning position CP1, or more precisely when setting in the first cleaning position CP1, or even more precisely when moving from the closed state to the first cleaning position CP1, the actuator arrangement 30 is configured to mechanically transfer at least a portion of the movement of, or the movement provided to, the first valve stem 31 into a first movement of the second valve stem 32. In this context it may be noted that an alternative embodiment is shown in FIG. 8 and that a general part of this detailed description is equally applicable to the embodiment of FIG. 8.

In the design shown in FIG. 6A, the actuator arrangement 30 is configured to mechanically transfer at least a portion of the movement of the first valve stem 31 into a first movement of the second valve stem 32.

Figure 8:
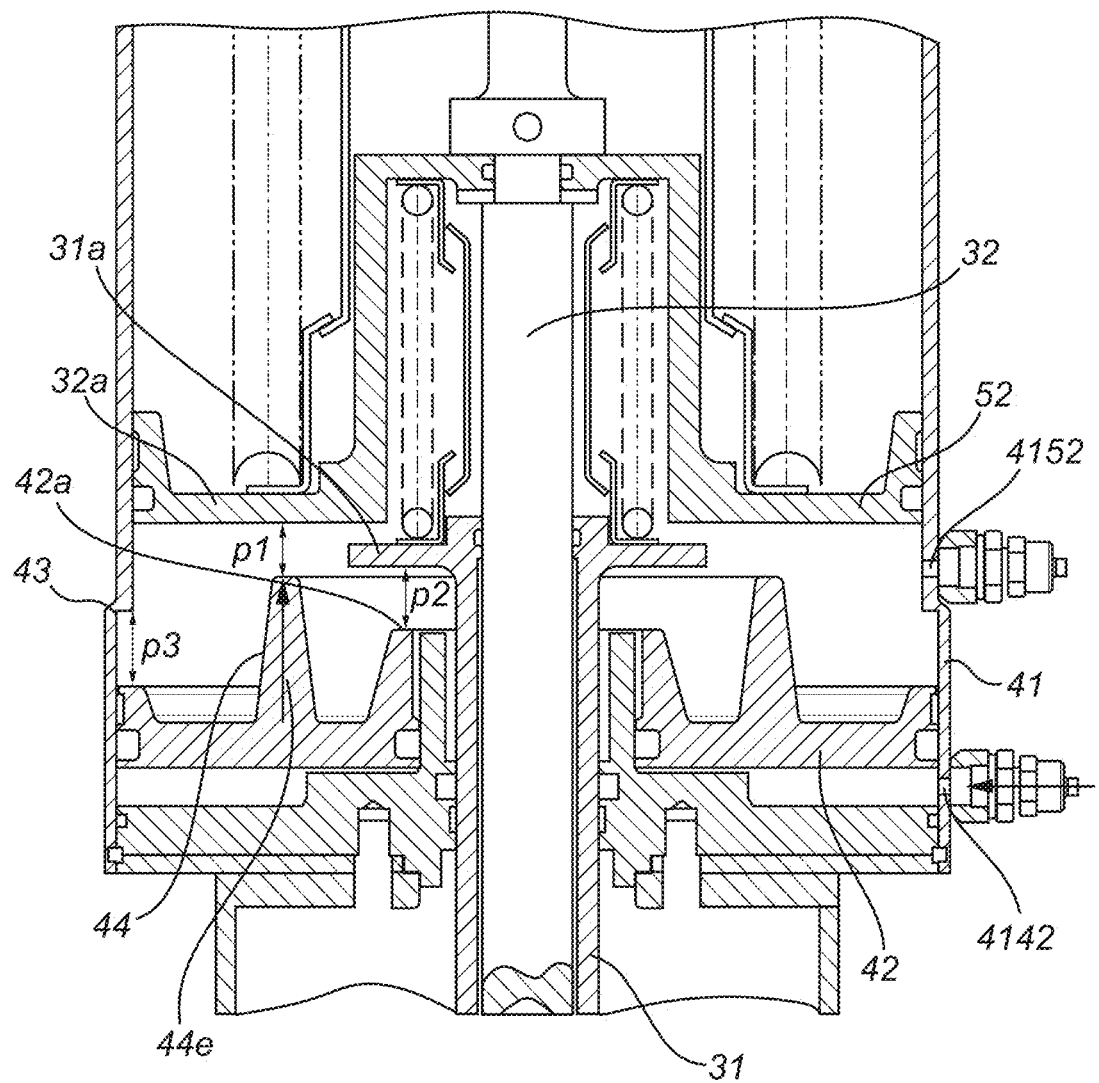
FIG. 8 discloses the lower part of an actuator arrangement according to another embodiment.

In the design shown in FIG. 8, the actuator arrangement 30 is configured to mechanically transfer at least a portion of the movement provided to the first valve stem 31 into a first movement of the second valve stem 32. In the design shown in FIG. 8, it is not the movement of the first valve stem 31 which causes the second valve stem 32 to move but rather a common component which moves both the first valve stem 31 and the second valve stem 32. This common component is in this description later on referred to as a seat lift piston 42.

In any case, the mechanical transfer of at least a portion of the movement of, or movement provided to, the first valve stem 31 into a first movement of the second valve stem 32 is such the second valve member 62 is moved towards the first conduit 65 while the second valve member 62 still sealingly engages the second valve seat 64. Thereby the movement of the first valve member 61 becomes detectable by the control unit 20 by detection of the first movement of the second valve stem 32 in a direction L' which extends opposite to the longitudinal direction L and thereby extends towards the control unit 20.

Thereby, the movement of the first valve member 61 may be indirectly detectable by the control unit 20 by detection of the movement of the second valve stem 32. Thereby it may be possible to confirm that the first cleaning has been performed. By transferring the movement of the first valve stem 31 into the movement of the second valve stem 32, the movement of the first valve stem 31 is detectable by the control unit 20 without the need of any external equipment.

Figure 4A:
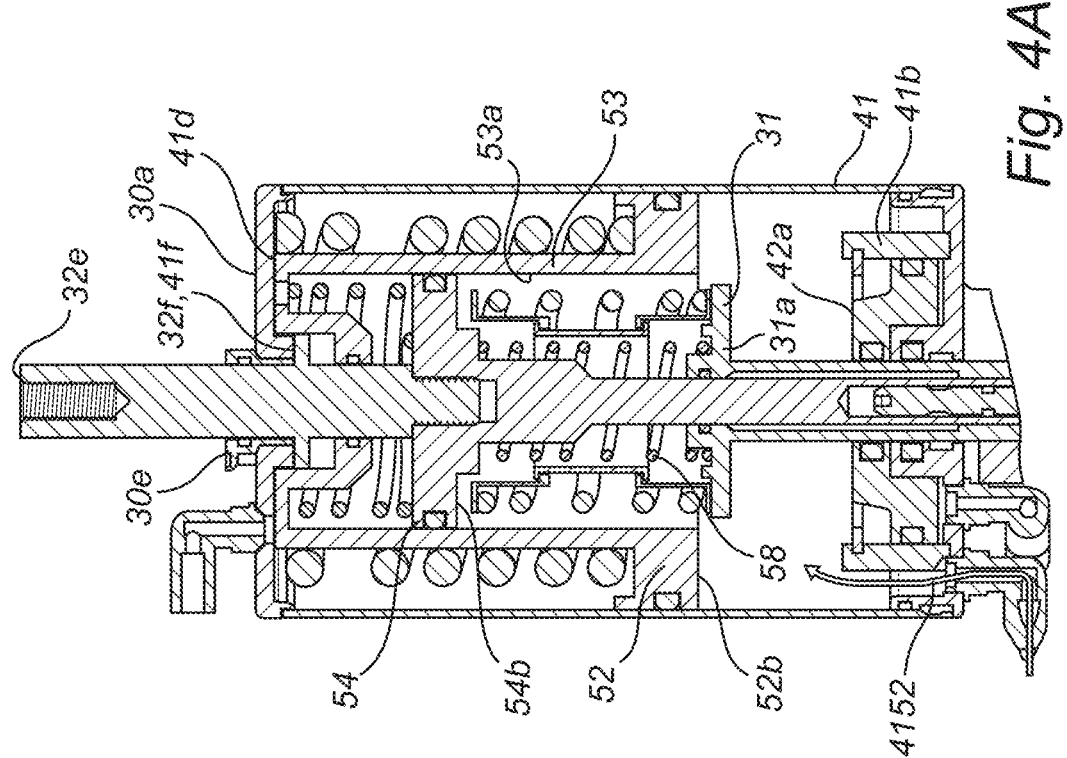

In this context it may be noted that it is preferred that the movement of the second valve stem 32 when the valve arrangement 10 is set in the first cleaning position CP1 is different from the movement of the second valve stem 32 when the valve arrangement 10 is set in an open position or open state. Thus, in an open position OP of the double valve in which the first valve member 61 and the second valve member 62 has been moved into the first conduit 65 to thereby open the mixing opening 67 and allowing fluid to flow between the first and second conduit 65, 66, the second valve stem 32 has been moved a second movement in a direction L' opposite to the longitudinal direction L and towards the control unit 20, the first movement of the second valve stem 32 having a stroke preferably being different from, and more preferably being shorter than, the second movement of the second valve stem 32. This is best shown when comparing the distance by which the end 32e extends out of the upper part 30e of the housing 30a of the actuator arrangement 30. In FIG. 4a, which is the open state, the end 32e extends out of the upper part 30e a distance being greater than the distance by which the end 32e extends out of the upper part 30e in FIG. 6A, which is the first cleaning position CP1. Thus, it is possible for the control unit 20 to differentiate between the open state and the first cleaning position CP1.

The distance the end 32e extends out of the upper part 30e of the housing 30a of the actuator arrangement 30 in the first cleaning position CP1, which is shown in FIG. 6A, is greater than the distance the end 32e extends out of the upper part 30e in the closed position, which is shown in FIG. 3A. Thus, it is possible for the control unit 20 to differentiate between the closed state and the first cleaning position CP1, as well as the open state.

The distance the end 32e extends out of the upper part 30e of the housing 30a of the actuator arrangement 30 in the second cleaning position CP2, which is shown in FIG. 5A, is smaller than the distance the end 32e extends out of the upper part 30e in the closed position, which is shown in FIG. 3A. Thus, it is possible for the control unit 20 to differentiate between the closed state and the second cleaning position CP2, as well as the first cleaning position CP1 and the open state.

The actuator arrangement 30 may, in order to set the flow control arrangement 60 in the first cleaning position CP1, comprise a first cylinder and piston arrangement comprising a main cylinder 41 and a seat lift piston 42 inside the main cylinder 41. The seat lift piston 42 is configured to be moved in the main cylinder 41 in the direction L' opposite to the longitudinal direction and thereby move the first valve stem 31 in the direction L' opposite to the longitudinal direction. Movement of the seat lift piston 42 is accomplished by directing pressurized air into the main cylinder 41 to the side of the seat lift piston 42 facing along, or more precisely in, the longitudinal direction L. In the orientation of FIG. 6A, this will be directing air to the main cylinder 41 beneath the seat lift piston 42 such that the seat lift piston 42 is pushed upwardly in the main cylinder 41. The supply of pressurized air is controlled by electronically controlled valves of the control unit 20. The air for activation of the seat lift piston 42 is supplied to the main cylinder via air inlet 4142 as indicated by the arrow at the air inlet 4142 in FIG. 6A and FIG. 8.

The main cylinder 41 may be provided with a stop 43 defining an end position of the movement of the seat lift piston 42 in the main cylinder 41 in the direction L' opposite to the longitudinal direction. The stop 43 is positioned such that the end position of the seat lift piston 42 corresponds to the second valve member 62 having reached the first cleaning position CP1.

As shown e.g. in FIG. 6A and FIG. 8, the seat lift piston 42 may be provided with an abutment surface 42a facing in the direction L' opposite the longitudinal direction L and being configured to abut a portion 31a of the first valve stem 31 such that the seat lift piston 42 is capable of moving the first valve stem 31 in the direction L' opposite the longitudinal direction L. The abutment surface 42a and the portion 31a are configured such that the first valve stem 31 is separably connected to the seat lift piston 42 such that the first valve stem 31 is further movable in the direction L' opposite to the longitudinal direction L even though the seat lift piston 42 has reached its end position. This facilitates the provision of a securely manoeuvrable first valve stem 31 capable of being positioned both in a first cleaning position CP1 in which the first valve member 61 has moved a comparably small distance into the first conduit 65 and in an open position OP where the first valve member 61 has moved a comparably large distance into the first conduit 65 thereby providing sufficient space for the second valve member 62 to also move sufficiently into the first conduit 65 such that the mixing opening 67 is sufficiently opened. In FIG. 6A, the abutment surface 42a and the portion 31a abut each other. In FIG. 4a, the abutment surface 42a and the portion 31a are distinctly separated from each other.

It may be noted that hitherto, the description has been referring to both the embodiment of FIGS. 3A-6A and 8. In the following there will initially be a more detailed description of the embodiment of FIG. 8 and thereafter there will be a more detailed description of the embodiment of FIGS. 3A-6A. However, it should be noted that it unless it is explicitly stated or technically impossible, it is conceivable to make use of preferred features mentioned with reference to the embodiment of FIG. 8 in the embodiment disclosed in FIGS. 3A-6A, or vice versa. The two embodiments share a number of features and preferred embodiments of one feature disclosed in respect of one embodiment is typically equally applicable to the other embodiment. However, the two embodiments differ in certain aspects when it comes to the approach concerning how to correlate the movement of the first valve stem 31 to a first movement of the second valve stem 32.

As shown in FIG. 8, a protruding portion 44 may be arranged on the seat lift piston 42 of the first cylinder and piston arrangement. The protruding portion 44 is arranged on the side of the seat lift piston 42 facing in the direction L' opposite to the longitudinal direction L. The protruding portion 44 protrudes from the seat lift piston 42 in the direction L' opposite to the longitudinal direction L. The protruding member 44 may be used to mechanically transmit movement of the seat lift piston 42 such that another member 32, a member 32 other than the first valve stem 31, may be moved a distance in the same direction as the seat lift piston 42.

The protruding portion 44 is preferably configured to act on a member 32a connected to the second valve stem 32. The protruding portion 44 is preferably configured to abut the member 32a connected to the second valve stem 32. In the embodiment of FIG. 8, the member 32a connected to the second valve stem 32 is a ring-shaped portion extending radially outwardly from the valve stem 32. The member 32a may be a separate part attached to the second valve stem 32 or may be integrally formed with the second valve stem 32. The member 32a connected to the second valve stem 32 is fixed to the second valve stem 32, preferably by being fixedly attached to or integrally formed with the second valve member 32. It may be noted that in the embodiment of FIG. 8, the member 32a also forms a main piston 52 configured to lift the valve members 61, 62 to the open position by supplying pressurised air via inlet 4152.

As shown in FIG. 8, the protruding portion 44 may have an extension 44e such that when the valve arrangement 10 is in the closed state there is a play p1 along, or more precisely in, the direction L' opposite to the longitudinal direction L between the protruding portion 44 and the member 32a connected to the second valve stem 32.

In the embodiment shown in FIG. 8, the movement of the second valve stem 32 is equal to the movement of the first valve stem 31 when the double valve is moved from the closed state to the first cleaning position CP1. The gap or play denoted p1 is equal to the gap or play p2 between the seat lift piston 42 and the first valve stem 31, or more precisely between the abutment surface 42a of the seat lift piston 42 and the portion 31a of the first valve stem 31. Thus, when the seat lift piston 42 is lifted by the pressurized air, the seat lift piston 42 will come into contact with both the first valve stem 31 and the second valve stem 32 simultaneously. The seat lift piston 42 will then continue and lift both the first valve stem 31 and the second valve stem 32 until the seat lift piston 42 hits the stop 43. The total movement of the seat lift piston 42 is defined by the gap or play denoted p3.

The embodiment of FIG. 8 may be altered such that the movement of the second valve stem 32 may be greater than the movement of the first valve stem 31 when the double valve is moved from the closed state to the first cleaning position CP1. This could e.g. be accomplished by designing the protrusion 44 such that the play p1 becomes smaller than the play p2, e.g. by having a larger extension 44e of the protrusion 44. Thereby, in the movement of the seat lift piston 42, the seat lift piston 42 will start moving the second valve stem 32 first and until the remaining portion of the play p2 has been overcome, the first valve stem 31 will remain unaffected.

The embodiment of FIG. 8 may be altered such that the movement of the second valve stem 32 may be less than the movement of the first valve stem 31 when the double valve is moved from the closed state to the first cleaning position CP1. This could e.g. be accomplished by designing the protrusion 44 such that the play p1 becomes greater than the play p2, e.g. by having a smaller extension 44e of the protrusion 44. Thereby, in the movement of the seat lift piston 42, the seat lift piston 42 will start moving the first valve stem 31 first and until the remaining portion of the play p1 has been overcome, the second valve stem 32 will remain unaffected.

In accordance with the embodiment shown in FIGS. 3A-6A, the actuator arrangement 30 of the valve arrangement 10 may further comprise a main piston 52 movable back and forth along the longitudinal direction L inside the main cylinder 41. This main piston 52 is designed to be affected by pressurised air via inlet 4152 as indicated by the arrow in FIG. 4A. This provides the open position as disclosed in FIG. 4A and it will be discussed in more detail below. The main piston 52 has an inner envelope surface 53*a* forming an inner cylinder 53 for an inner piston 54 connected to the second valve stem 32.

The valve arrangement 10 may further comprise a first spring 55 arranged inside the inner cylinder 53 formed of the main piston 52. The first spring 55 is arranged between the inner piston 54 and the first valve stem 31 or between the inner piston 54 and the seat lift piston 42. In the preferred embodiment shown in FIGS. 3A-6A, the first spring 55 is arranged between the inner piston 54 and the first valve stem 31.

The valve arrangement 10 may further comprise a second spring 56 arranged inside the inner cylinder 53 formed of the main piston 52. The second spring 56 is arranged between the inner piston 54 and a longitudinally facing inside end surface 53*b* of the inner cylinder 53 formed by the main piston 52.

The first spring 55 is stronger than the second spring 56 such that the first spring 55 transfers a movement of the seat lift piston 42, preferably via the first valve stem 31, to the inner piston 54 and the second spring 56 allows movement of the inner piston 54 in a direction L' opposite the longitudinal direction L relative to the inner cylinder 53 formed of the main piston 52.

By providing this set-up with first and second springs 55, 56 inside an inner cylinder 53 formed of a main piston 52 and by balancing the strengths of the first and the second springs 55, 56, there is accomplished a system where the main piston 52 may be used to lift the valve stems 31, 32 to accomplish opening of both valve members 61, 62, and where both the first valve stem 31 and the second valve stem 32 may be moved in the direction L' opposite the longitudinal direction L to reach a first cleaning position CP1 while still allowing the second valve stem 32 to move also along, or more precisely in, the longitudinal direction L relative to the main piston 52 such that a second cleaning position CP2 in which the second valve seat 64 is exposed and the second valve member 62, the second valve seat 64 and the second conduit 66 are cleaned.

The second spring 56 may have a stroke length to a maximum possible compression which is greater than an allowable movement of the second valve member 62 while the second valve member 62 remains in the closed state such that the second valve member 62 is movable into the first cleaning position CP1. As shown in FIG. 6A, the seat lift piston 42 reaches the stop 43 before the second spring 56 is fully compressed. Thereby the second spring 56 does not interfere with the intended positioning of the second valve stem 32 and the second valve member 62 in the first cleaning position CP1.

The first spring 55 may be pre-tensioned by being connected to a mechanical arrangement 55*a* which sets a maximum length of the first spring 55 which maximum length is shorter than a free length of the first spring 55. The mechanical arrangement is designed such that it still allows the first spring 55 to be further compressed relative to the maximum length set by the mechanical arrangement 55*a*. In the preferred embodiment, the mechanical arrangement 55*a* is a cage formed of telescopically arranged sleeves. By pre-tensioning the first spring 55, there is provided a minimum force that need to be overcome before any further compression of the first spring 55 occurs. Thereby it may be secured that the first spring 55 is stronger than the second spring 56 throughout the compression of the second spring 56.

The valve arrangement 10 may further comprise a main spring 57 arranged inside the main cylinder 41. The main spring 57 is configured to bias the main piston 52 in the longitudinal direction L. This main spring 57 may be configured to keep the first and second valve stems 31, 32 and thereby the first and second valve members 61, 62 in the closed position CLP when no air is supplied to the valve arrangement 10. This closed position or closed state is shown in FIGS. 3A-B. The main spring 57 forces the main piston 52 in the longitudinal direction until the main piston 52 abuts an abutment surface 41*a*. In the preferred embodiment, the abutment surface 41*a* is formed by an inner ring-shaped wall 41*b* defining an inner cylinder for the seat lift piston 42 inside the main cylinder 41. The second valve stem 32 is forced in the longitudinal direction L by the second spring 56 such that the second valve member 62 engages the second valve seat 64. The first valve stem 31 is in turn forced in the longitudinal direction L by the first spring 55 relative to the second valve stem 32 such that the first valve member 61 engages the first valve seat 63. The first valve stem 31 is kept in the intended position by the mechanical arrangement 55*a* being fully extended. It may in this context be noted that the mechanical arrangement 55*a* has a maximum length such that there is a distance between the first and second valve members 61, 62, as is best shown in FIG. 3B. The movement of the first valve stem 31 as well as the second valve stem 32 in the longitudinal direction L may be stopped by the first valve member 61 abutting the first valve seat 63. When the first valve member 61 abuts the first valve seat 63, and thus the first valve stem 31 is stopped from further movement in the longitudinal direction L, the further movement of the second valve stem 32 and thus also of the second valve member in the longitudinal direction L is stopped by the first spring 55 being stronger than the second spring 56 and having fully extended the mechanical arrangement 55*a*.

As shown in FIGS. 3A-6A, the actuator arrangement 30 may further comprise a third spring 58 arranged inside the inner cylinder 53 formed of the main piston 52. The third spring 58 is arranged between the inner piston 54 and the first valve stem 31. In the closed position shown in FIG. 3A, the third spring 58 has no effect to the system. The third spring 58 is weaker than the second spring 56.

As mentioned above, when the actuator arrangement 30 is activated to affect the first cleaning position, pressurized air is supplied via the air inlet 4142. With reference to FIG. 6A, this results in that that seat lift piston 42 is moved in the direction L' opposite to the longitudinal direction L until it reaches the stop 43. The seat lift piston 42 moves in turn the first valve stem 31 a first movement in the direction L' opposite to the longitudinal direction L. The first spring 55 is strong enough to in turn move the second valve stem 32 with the movement of the first valve stem 31. Preferably, the first spring 55 is pre-tensioned to such an extent that the force needed to move the second valve stem 32 against the force of the second spring 56 and against any friction force or the like is less than the pre-tension force such that the first spring 55 is not compressed. The second spring 56 is compressed the corresponding distance as the movement of the second valve stem 32.

In the embodiment shown in FIGS. 3A-6A, the movement of the second valve stem 32 is equal to the movement of the first valve stem 31 when the double valve is moved from the closed state to the first cleaning position CP1.

The movement of the second valve stem 32 may be greater than the movement of the first valve stem 31 when the double valve is moved from the closed state to the first cleaning position CP1. The movement of the second valve stem 32 may be less than the movement of the first valve stem 31 when the double valve is moved from the closed state to the first cleaning position CP1. Differences in the movement of the first and second valve stem may e.g. be provided by the parts abutting each other such that there is a play before the abutment occurs and/or that one of the parts encounters a step and the other part may continue its movement.

As mentioned briefly above, the main piston 52 is designed to be affected by pressurised air via inlet 4152 as indicated by the arrow in FIG. 4A. This provides the open position of the valve members 61, 62 as disclosed in FIG. 4B. The main piston 52 is pushed by the pressurized air in the direction L' opposite to the longitudinal direction L until the main piston 52 abuts a rear wall 41d of the main cylinder 41. In the disclosed embodiment this rear wall 41d doubles and forms part of the housing 31 of the actuator arrangement 30. However, it is also conceivable that the main cylinder 41 is housed inside the housing 31 of the actuator arrangement 30 such that the rear or upper part 30e of the housing 31 is separated from the rear or upper wall 41d of the main cylinder 41. The pressurized air from the inlet 4152 acts onto the piston surface 52b of the main piston 52 and onto the piston surface 54b of an inner piston 54. In this context it may be noted that the lifting of the main piston 52 may be used to actually lift the valve stems 31, 32 and/or may be used to provide space necessary to allow the valve stems 31, 32 to be lifted. In the embodiment of FIGS. 3A-6A, the second valve stem 32 is lifted by the air acting on the inner piston 54. The second valve stem 32 is lifted until a stop 32f on the second valve stem 32 hits a stop 41f. The stop 41f may be a part of the main cylinder 41 and/or of the housing 31 of the actuator arrangement 30. In FIG. 4A, the stop 32f and the stop 41f are shown abutting each other. In FIG. 3A, the stops 32f, 41f are shown at a distance from each other. The second valve member 62 then lifts the first valve member 61. It may in this context be noted that the first spring 55 inside the mechanical arrangement 55a has a length being shorter than the distance between the inner piston 54 and the first valve stem 31 and thereby the first spring 55 will loose contact with one or both of the inner piston 54 and the first valve stem 31. The first spring 55 and the mechanical arrangement 55a may be arranged loosely such that it is allowed to follow gravity or may be fixedly connected to either the inner piston 54 or the first valve stem 31. At this stage the third spring 58 provides a force acting to push the inner piston 54 and the first valve stem 31 from each other, which in turn thereby provides a force holding the first and second valve members 61, 62 against each other.

As briefly mentioned above, FIGS. 5A and 5B discloses a second cleaning position CP2 in which the second valve member 62 has been pushed a short distance into the second conduit 66 thereby exposing the second valve seat 64 associated with the second valve member 62. This has been accomplished by pressurized air being supplied via the inlet 4154. As mentioned above, the supply of pressurized air is controlled by electronically controlled valves of the control unit 20. The air supplied via inlet 4154 enters into the main cylinder 41 to the side of the main piston 52 facing in the direction L' opposite the longitudinal direction L, i.e. to the side being opposite the side to which the air from inlet 4152 is supplied. The pressurized air then passes through an opening 52c in the wall of the main piston 52 such that the pressurized air enters into the inner cylinder 53 formed of the main piston 52. The opening 52c is positioned such that the pressurized air from the inlet 4154 will end up in the inner cylinder 53 on the side of the inner piston 54 facing in the direction L' being opposite to the longitudinal direction L. Thereby, the main piston 52 will, due to the force from the main spring 57 and from the air acting on the perimeter, remain in the closed position resting against the abutment surface 41a and the inner piston 54 will be pushed in the longitudinal direction L until the stop 32f abuts a rear side of the main piston 52. The movement of the inner piston 54 will provide a corresponding movement of the second valve stem 32 and the second valve member 62 in the longitudinal direction L. The first spring 55 is compressed by the movement of the inner piston 54 against the first valve stem 31. The first spring 55 acts with a force onto the first valve stem 31 in the longitudinal direction. However, the first valve stem 31 is prevented from moving such that the first valve member 61 remains in contact with the first valve seat 63 and the mixing opening 67 thereby still remains closed. Thus, there is no fluid connection between the first and the second conduits 65, 66. With the valve members 61, 62 in these positions, the second conduit 66, the second valve 62 and the second valve seat 64 may be cleaned. The first valve stem 31 may abut a stop preventing it from moving downwardly from the closed position of the first valve member 61. Alternatively, the first valve member 61 and the first valve seat 41 may be designed such that it cannot move further in the longitudinal direction L once the first valve member 61 has reached the intended closed position in which it sealingly engages the first valve seat 63.

Figure 7A:
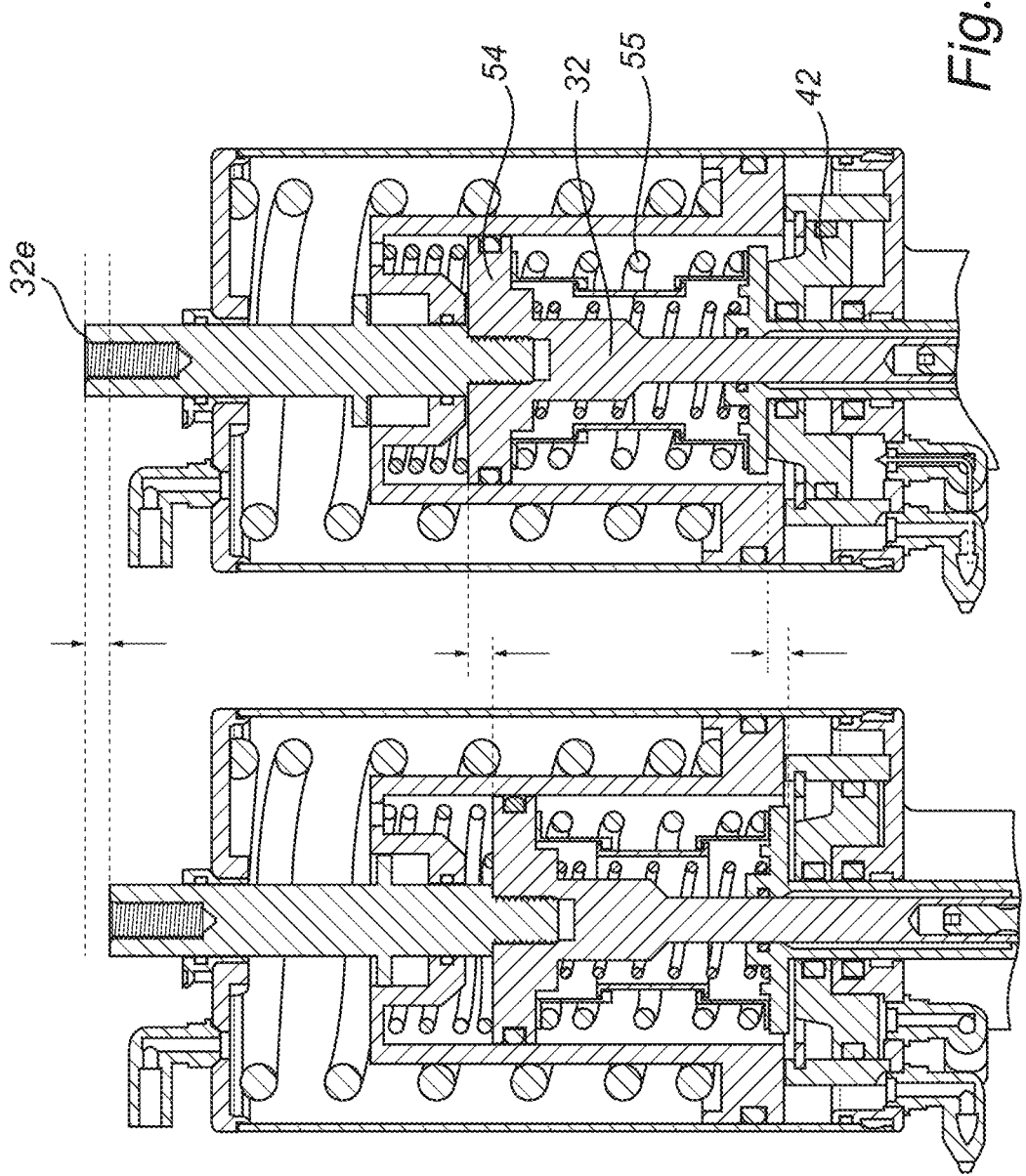

FIGS. 7A and 7B shows on the left hand side figures the internal parts and their positions inside the actuator arrangement and inside the flow control arrangement with the flow control arrangement in the closed state and disclose on the right hand side the same with the flow control arrangement in the first cleaning position. The left hand figures are copies of FIGS. 3A and 3B and the right hand figures are copies of FIGS. 6A and 6B. FIG. 7B discloses the movement of the first valve member 61 and the movement of the second valve member 62, when the flow control arrangement 60 moves from the closed position to the first cleaning position CP1.

In this context it may especially be noted that the second valve member 62 has been moved a distance indicated by the arrows in the direction L' being opposite to the longitudinal direction L. As mentioned above, this movement of the second valve member 62 has been achieved by the seat lift piston 42 lifting the first valve stem 31 a distance. The first valve stem 31 has in turn via the first spring 55 lifted the second valve stem 32 by acting on the inner piston 54. This lifting of the second valve stem 32 is in turn detectable by the control unit 20 by the end 32e of the second valve stem 32 extending an increased distance from the actuator arrangement 30 as seen in the direction L' opposite to the longitudinal direction L.

The first valve stem 31 comprises, as e.g. indicated in FIG. 3B, a longitudinally elongate valve part 61b closing the interface where the first valve stem 31 extends into the first conduit 65. The valve part 61b has a longitudinal extension such that it closes the interface irrespective of the position of the first valve stem 31.

The second valve member 62 may be hollow such that fluid may enter into the interior of the second valve member 62 given that there is a distance between the first valve member 61 and the second valve member 62 and given that at least one of the valve members 61, 62 has been moved out of the sealingly engagement with its respective valve seat 63, 64. This is a reason why there is a third spring 58 keeping the valve members 61, 62 against each other when the valve arrangement 10 is set in the open position as shown in FIGS. 4A and 4B. The second valve member 62 extends in the longitudinal direction L through a bottom part of the second conduit 66. This hollow interior of the second valve member 62 extends through the length of the second valve member 62 to a position outside the second conduit 66. Thereby, the hollow second valve member 62 may be used to drain the system from cleaning fluid, both in the first cleaning position CP1 and in the second cleaning position CP2. If the second valve member 62 extends through the bottom part of the second conduit 66 the second valve member 62 is provided with a longitudinally elongate valve part 62b closing the interface where the second valve member 62 extends out of the second conduit 66. The valve part 62b has a longitudinal extension such that it closes the interface irrespective of the position of the second valve member 62.

It is contemplated that there are numerous modifications of the embodiments described herein, which are still within the scope of the invention as defined by the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A valve arrangement comprising
a control unit,
an actuator arrangement, and
a flow control arrangement,
the actuator arrangement being controlled by the control unit and being configured to control the flow control arrangement,
the actuator arrangement comprising:
a first valve stem extending along a longitudinal direction towards the flow control arrangement and being configured to be connected to and control movement of a first valve member of the flow control arrangement,
a second valve stem extending along the longitudinal direction and being configured to be connected to and control movement of a second valve member of the flow control arrangement, wherein the first valve stem is hollow and the second valve stem extends inside the first valve stem, and wherein the second valve stem extends through the actuator arrangement and into the control unit such that the control unit is capable of detecting the position of the second valve stem along the longitudinal direction,
wherein the flow control arrangement comprises a first and a second conduit section each being configured to allow a respective flow of a fluid and being arranged beside each other as seen along the longitudinal direction, wherein the two conduit sections are fluidly interconnected by a mixing opening being selectively closable and openable by a double valve formed by the first and second valve members, wherein in a closed state of the double valve, the first and second valve members are sealingly engaging a first and a second valve seat, respectively, each valve seat extending around the mixing opening, wherein the first and second valve members are movable relative to each other to allow selective cleaning of: i) the first conduit section, the first valve member, and the first valve seat: and ii) the second conduit section, the second valve member, and the second valve seat,
wherein when moving from the closed state to a first cleaning position, in which the first conduit, the first valve member and first valve seat are to be cleaned, the first valve stem is configured to provide a movement of the first valve member into the first conduit thereby exposing the first valve seat,
wherein when moving from the closed state to the first cleaning position, the actuator arrangement is configured to mechanically transfer at least a portion of the movement of, or provided to, the first valve stem into a first movement of the second valve stem, such that the second valve member is moved towards the first conduit while the second valve member still sealingly engages the second valve seat, the control unit being configured to detect the movement of the first valve member by the control unit detecting the first movement of the second valve stem in a direction which extends opposite to the longitudinal direction and thereby extends towards the control unit.

2. The valve arrangement according to claim 1, wherein the first and the second conduit section each extends in and is configured to allow a respective flow of a fluid in a transverse direction.

3. The valve arrangement according to claim 1, wherein when moving from the closed state to an open position of the double valve, in which the first valve member and the second valve member has been moved into the first conduit to thereby open the mixing opening and allowing fluid to flow between the first and second conduit, the second valve stem has been moved a second movement in the direction opposite to the longitudinal direction and towards the control unit, the first movement of the second valve stem having a stroke being shorter than the second movement of the second valve stem.

4. The valve arrangement according to claim 1, wherein the actuator arrangement, in order to move the flow control arrangement into the first cleaning position, comprises a first cylinder and piston arrangement comprising a main cylinder and a seat lift piston inside the main cylinder, the seat lift piston being configured to be moved in the main cylinder in the direction opposite to the longitudinal direction and thereby move the first valve stem in the direction opposite to the longitudinal direction.

5. The valve arrangement according to claim 4, wherein the main cylinder is provided with a stop defining an end position of the movement of the seat lift piston in the main cylinder in the direction opposite to the longitudinal direction, the stop being positioned such that the end position of the seat lift piston corresponds to the second valve member having reached the first cleaning position.

6. The valve arrangement according to claim 5, wherein the seat lift piston is provided with an abutment surface facing in the direction opposite the longitudinal direction and being configured to abut a portion of the first valve stem such that the seat lift piston is capable of moving the first valve stem in the direction opposite the longitudinal direction, such that the first valve stem is separably connected to the seat lift piston such that the first valve stem is further movable in the direction opposite to the longitudinal direction even though the seat lift piston has reached its end position.

7. The valve arrangement according to claim 4, wherein a protruding portion is arranged on the seat lift piston of the first cylinder and piston arrangement, the protruding portion protruding from the seat lift piston in the direction opposite to the longitudinal direction.

8. The valve arrangement according to claim 7, wherein the protruding portion is configured to act on a member connected to the second valve stem.

9. The valve arrangement according to claim 7, wherein the protruding portion has an extension such that when the valve arrangement is in the closed state there is a play in the direction opposite to the longitudinal direction between the protruding portion and the member connected to the second valve stem.

10. The valve arrangement according to claim 4, further comprising
   a main piston movable back and forth along the longitudinal direction inside the main cylinder, the main piston having an inner envelope surface forming an inner cylinder for an inner piston connected to the second valve stem,
   a first spring arranged inside the inner cylinder formed of the main piston and between the inner piston and the first valve stem or the seat lift piston, and
   a second spring arranged inside the inner cylinder formed of the main piston and between the inner piston and a longitudinally facing inside end surface of the inner cylinder formed by the main piston,
   wherein the first spring is stronger than the second spring such that the first spring transfers a movement of the seat lift piston to the inner piston and the second spring allows movement of the inner piston in the direction opposite the longitudinal direction relative to the inner cylinder formed of the main piston.

11. The valve arrangement according to claim 10, wherein the second spring has a stroke length to a maximum possible compression which is greater than an allowable movement of the second valve member while remaining in the closed state such that the second valve member is movable into the first cleaning position.

12. The valve arrangement according to claim 10, wherein the first spring is pre-tensioned by being connected to a mechanical arrangement which sets a maximum length of the first spring which maximum length is shorter than a free length of the first spring, the mechanical arrangement still allowing the first spring to be further compressed relative to the maximum length set by the mechanical arrangement.

13. The valve arrangement according to claim 10, further comprising a main spring arranged inside the main cylinder and being configured to bias the main piston in the longitudinal direction.

14. An actuator arrangement configured to be connected on one side to a control unit and on another side be connected to a flow control arrangement such that the actuator arrangement is controlled by the control unit and is in turn configured to control the flow control arrangement, the actuator arrangement comprising:
   a first valve stem extending along a longitudinal direction intended to face towards the flow control arrangement and being configured to be connected to and control movement of a first valve member of the flow control arrangement,
   a second valve stem extending along the longitudinal direction and being configured to be connected to and control movement of a second valve member of the flow control arrangement, wherein the first valve stem is hollow and the second valve stem extends inside the first valve stem, and wherein the second valve stem extends through the actuator arrangement such that it can extend into the control unit connected to the actuator arrangement thereby allowing the control unit to detect the position of the second valve stem along the longitudinal direction,
   wherein when moving from the closed state to a first cleaning position, the first valve stem is configured to move in a direction opposite the longitudinal direction,
   wherein when moving from the closed state to the first cleaning position, the actuator arrangement is configured to mechanically transfer at least a portion of the movement of, or provided to, the first valve stem into a first movement of the second valve stem, whereby the movement of the first valve member is detectable by the control unit by detection of the first movement of the second valve stem in the direction opposite to the longitudinal direction and towards the control unit,
   wherein the actuator arrangement, in order to move the flow control arrangement into the first cleaning position, comprises a first cylinder and piston arrangement comprising a main cylinder and a seat lift piston inside the main cylinder, the seat lift piston being configured to be moved in the main cylinder in the direction opposite to longitudinal direction and therefore move the first valve stem in the direction opposite to the longitudinal, and
   wherein the main cylinder is provided with a stop defining an end position of the movement of the seat lift piston in the main cylinder the direction opposite to the longitudinal direction, the stop being positioned such that position of the seat lift piston corresponds to the second valve member having reached the first cleaning position.

15. A method for detecting a first cleaning position in an actuator arrangement according to claim 14, the method comprising:
   providing a movement of the first valve stem in order to move the first valve member into a first conduit thereby exposing a first valve seat extending around a mixing opening and being associated with the first valve member,
   mechanically transferring the movement of, or provided to, the first valve stem into a movement of the second valve stem thereby moving the second valve member towards the first conduit while the second valve member still sealingly engages a second valve seat extending around the mixing opening and being associated with the second valve member, and thereby allowing the movement of the first valve stem to be indirectly detected by a control unit detecting the movement of the second valve stem in the direction opposite to the longitudinal direction and towards the control unit.

16. A method for detecting a first cleaning position in a valve arrangement in accordance with claim 1, the method comprising:
   providing a movement of the first valve stem in order to move the first valve member into the first conduit thereby exposing the first valve seat extending around a mixing opening and being associated with the first valve member,
   mechanically transferring the movement of, or provided to, the first valve stem into a movement of the second valve stem thereby moving the second valve member towards the first conduit while the second valve member still sealingly engages the second valve seat extending around the mixing opening and being associated with the second valve member, and indirectly detecting the movement of the first valve stem by a control unit detecting the movement of the second valve stem in the direction opposite to the longitudinal direction and towards the control unit.

17. A method for detecting a first cleaning position in a valve arrangement, the valve arrangement comprising: a control unit; an actuator arrangement; and a flow control arrangement; the actuator arrangement being controlled by the control unit and being configured to control the flow control arrangement; the actuator arrangement comprising:
   a first valve stem extending along a longitudinal direction towards the flow control arrangement and being configured to be connected to and control movement of a first valve member of the flow control arrangement,
   a second valve stem extending along the longitudinal direction and being configured to be connected to and control movement of a second valve member of the flow control arrangement, wherein the first valve stem is hollow and the second valve stem extends inside the first valve stem, the second valve stem extending through the actuator arrangement and into the control unit such that the position of the second valve stem along the longitudinal direction is detectable by the control unit,
   the flow control arrangement comprising a first and a second conduit section each being configured to allow a respective flow of a fluid and being arranged beside each other as seen along the longitudinal direction, the two conduit sections being fluidly interconnected by a mixing opening that is selectively closable and openable by a double valve formed by the first and second valve members, wherein in a closed state of the double valve, the first and second valve members are sealingly engaging a first and a second valve seat, respectively, each valve seat extending around the mixing opening, wherein the first and second valve members are movable relative to each other to allow selective cleaning of the first conduit section and the second conduit section, of the first valve member and the second valve member, and of the first valve seat and the second valve seat,
the method comprising:
   operating the double valve to move from the closed state to a first cleaning position in which the first conduit, the first valve member and the first valve seat are to be cleaned, the operating of the double valve to move from the closed state to the first cleaning position including movement of the first valve stem to move the first valve member into the first conduit to thereby expose the first valve seat;
   mechanically transferring at least a portion of the movement of, or provided to, the first valve stem into a movement of the second valve stem during the operating of the double valve such that the second valve member is moved towards the first conduit while the second valve member still sealingly engages the second valve seat; and
   indirectly detecting the movement of the first valve stem by virtue of the control unit detecting the movement of the second valve stem in a direction opposite to the longitudinal direction and towards the control unit.

18. A valve arrangement comprising
   a control unit,
   an actuator arrangement, and
   a flow control arrangement,
   the actuator arrangement being controlled by the control unit and being configured to control the flow control arrangement,
   the actuator arrangement comprising:
   a first valve stem extending along a longitudinal direction towards the flow control arrangement and being configured to be connected to and control movement of a first valve member of the flow control arrangement,
   a second valve stem extending along the longitudinal direction and being configured to be connected to and control movement of a second valve member of the flow control arrangement, wherein the first valve stem is hollow and the second valve stem extends inside the first valve stem, and wherein the second valve stem extends through the actuator arrangement and into the control unit such that the control unit is capable of detecting the position of the second valve stem along the longitudinal direction,
   wherein the flow control arrangement comprises a first and a second conduit section each being configured to allow a respective flow of a fluid and being arranged beside each other as seen along the longitudinal direction, wherein the two conduit sections are fluidly interconnected by a mixing opening being selectively closable and openable by a double valve formed by the first and second valve members, wherein in a closed state of the double valve, the first and second valve members are sealingly engaging a first and a second valve seat, respectively, each valve seat extending around the mixing opening, wherein the first and second valve members are movable relative to each other to allow selective cleaning of: i) the first conduit section, the first valve member, and the first valve seat; and ii) the second conduit section, the second valve member, and the second valve seat,
   wherein when moving from the closed state to a first cleaning position, in which the first conduit, the first valve member and first valve seat are to be cleaned, the first valve stem is configured to provide a movement of the first valve member into the first conduit thereby exposing the first valve seat,
   wherein when moving from the closed state to the first cleaning position, the actuator arrangement is configured to mechanically transfer at least a portion of the movement of, or provided to, the first valve stem into a first movement of the second valve stem, such that the second valve member is moved towards the first conduit while the second valve member still sealingly engages the second valve seat, the control unit being configured to detect the movement of the first valve member by the control unit detecting the first movement of the second valve stem in a direction which extends opposite to the longitudinal direction and thereby extends towards the control unit,
   wherein the actuator arrangement, in order to move the flow control arrangement into the first cleaning position, comprises a first cylinder and piston arrangement comprising a main cylinder and a seat lift piston inside the main cylinder, the seat lift piston being configured to be moved in the main cylinder in the direction opposite to the longitudinal direction and thereby move the first valve stem in the direction opposite to the longitudinal direction,
   wherein the main cylinder is provided with a stop defining an end position of the movement of the seat lift piston in the main cylinder in the direction opposite to the longitudinal direction, the stop being positioned such that the end position of the seat lift piston corresponds to the second valve member having reached the first cleaning position.

19. A valve arrangement comprising
a control unit,
an actuator arrangement, and
a flow control arrangement,
the actuator arrangement being controlled by the control unit and being configured to control the flow control arrangement,
the actuator arrangement comprising:
a first valve stem extending along a longitudinal direction towards the flow control arrangement and being configured to be connected to and control movement of a first valve member of the flow control arrangement,
a second valve stem extending along the longitudinal direction and being configured to be connected to and control movement of a second valve member of the flow control arrangement, wherein the first valve stem is hollow and the second valve stem extends inside the first valve stem, and wherein the second valve stem extends through the actuator arrangement and into the control unit such that the control unit is capable of detecting the position of the second valve stem along the longitudinal direction,
wherein the flow control arrangement comprises a first and a second conduit section each being configured to allow a respective flow of a fluid and being arranged beside each other as seen along the longitudinal direction, wherein the two conduit sections are fluidly interconnected by a mixing opening being selectively closable and openable by a double valve formed by the first and second valve members, wherein in a closed state of the double valve, the first and second valve members are sealingly engaging a first and a second valve seat, respectively, each valve seat extending around the mixing opening, wherein the first and second valve members are movable relative to each other to allow selective cleaning of: i) the first conduit section, the first valve member, and the first valve seat; and ii) the second conduit section, the second valve member, and the second valve seat,
wherein when moving from the closed state to a first cleaning position, in which the first conduit, the first valve member and first valve seat are to be cleaned, the first valve stem is configured to provide a movement of the first valve member into the first conduit thereby exposing the first valve seat,
wherein when moving from the closed state to the first cleaning position, the actuator arrangement is configured to mechanically transfer at least a portion of the movement of, or provided to, the first valve stem into a first movement of the second valve stem, such that the second valve member is moved towards the first conduit while the second valve member still sealingly engages the second valve seat, the control unit being configured to detect the movement of the first valve member by the control unit detecting the first movement of the second valve stem in a direction which extends opposite to the longitudinal direction and thereby extends towards the control unit,
wherein the actuator arrangement, in order to move the flow control arrangement into the first cleaning position, comprises a first cylinder and piston arrangement comprising a main cylinder and a seat lift piston inside the main cylinder, the seat lift piston being configured to be moved in the main cylinder in the direction opposite to the longitudinal direction and thereby move the first valve stem in the direction opposite to the longitudinal direction,
a main piston movable back and forth along the longitudinal direction inside the main cylinder, the main piston having an inner envelope surface forming an inner cylinder for an inner piston connected to the second valve stem,
a first spring arranged inside the inner cylinder formed of the main piston and between the inner piston and the first valve stem or the seat lift piston, and
a second spring arranged inside the inner cylinder formed of the main piston and between the inner piston and a longitudinally facing inside end surface of the inner cylinder formed by the main piston, and
wherein the first spring is stronger than the second spring such that the first spring transfers a movement of the seat lift piston to the inner piston and the second spring allows movement of the inner piston in the direction opposite the longitudinal direction relative to the inner cylinder formed of the main piston.

* * * * *